United States Patent [19]

Rokksku et al.

[11] Patent Number: 4,702,652
[45] Date of Patent: Oct. 27, 1987

[54] ADVANCED MEMORY TYPE PROFILING CONTROL METHOD FOR A MACHINE TOOL

[75] Inventors: Tadashi Rokksku; Akira Houzouji; Shunji Omori; Takayuki Toto, all of Hiroshima, Japan

[73] Assignee: Mitsubishi Jukogyo Kabushiki Kaisha, Tokyo, Japan

[21] Appl. No.: 814,626

[22] Filed: Dec. 30, 1985

[51] Int. Cl.$^4$ .................. B23Q 35/14; G05B 19/33
[52] U.S. Cl. .................................. 409/84; 318/578; 364/474
[58] Field of Search ............... 364/474, 520; 318/578; 409/84, 85, 92, 96, 98, 99, 114, 125, 126, 127, 128, 129, 131, 79, 93, 121

[56] References Cited

U.S. PATENT DOCUMENTS

| | | | |
|---|---|---|---|
| 3,631,759 | 1/1972 | Ronner | 409/127 |
| 4,317,644 | 3/1982 | Hosoi | 409/98 |
| 4,334,272 | 6/1982 | Imazeki et al. | 364/474 |
| 4,355,362 | 10/1982 | Imazeki et al. | 409/99 |

*Primary Examiner*—Z. R. Bilinsky
*Attorney, Agent, or Firm*—Toren, McGeady & Associates

[57] ABSTRACT

An advanced memory type profiling control method for a machine tool including a tracer which is relatively moved along a surface of a model and a machine body provided with a cutting tool such as an end mill whereby a work having the same shape as that of the model is made, includes driving the tracer along the model surface with the tracer preceding the machine body by a predetermined time, sampling coordinate data of a position of the tracer and data of displacement of a stylus, which is moved in contact with the model surface, to the tracer at a predetermined sampling time, calculating coordinate values of points on a locus formed by a movement of a central point of the stylus ball on the basis of the sampled data, calculating a coordinate value of a point following the central point of the stylus ball at retard, for each sampling time to obtain a command position data to the machine body, storing the command position data in a memory successively, and supplying the stored data to a drive control unit of the machine body successively with a predetermined delay time after storing the data.

4 Claims, 49 Drawing Figures

FIG.1 (a) PRIOR ART
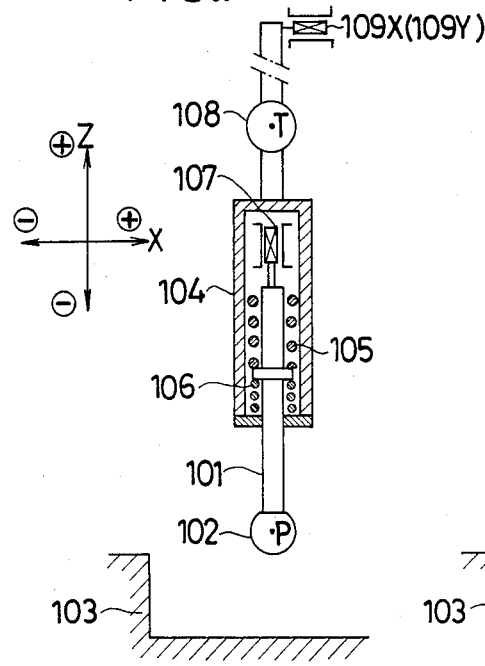
FIG.1 (b) PRIOR ART
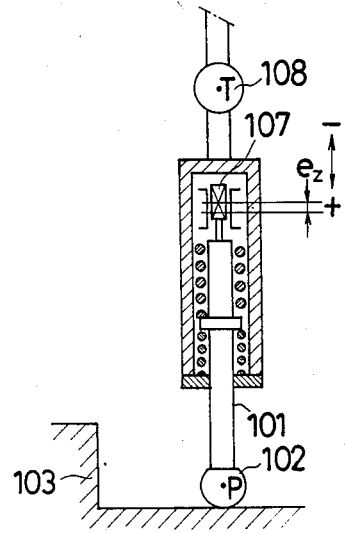
FIG.1 (c) PRIOR ART
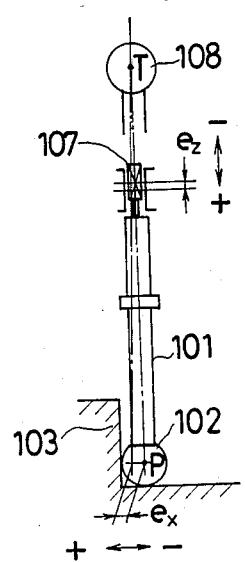
FIG.1 (d) PRIOR ART
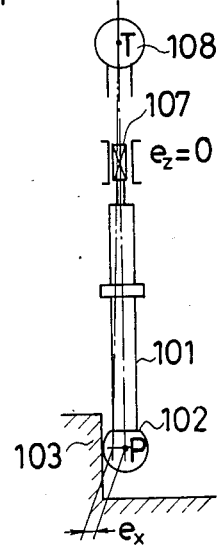

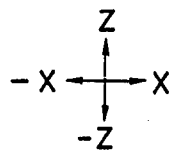
FIG. 13(a)  FIG. 13(b)  FIG. 13(c)  FIG. 13(d)
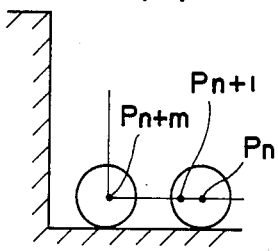 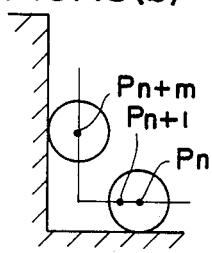 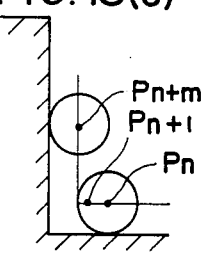 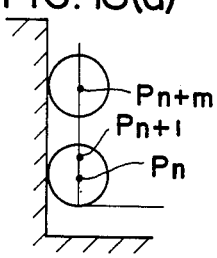
FIG.14(a)  FIG.14(b)  FIG.14(c)
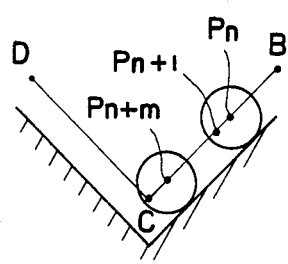 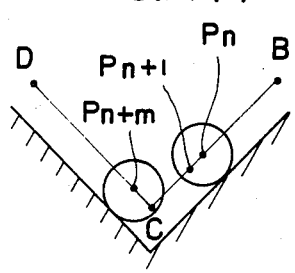 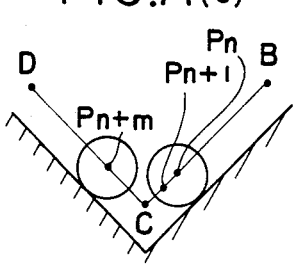
FIG.14(d)  FIG.14(e)
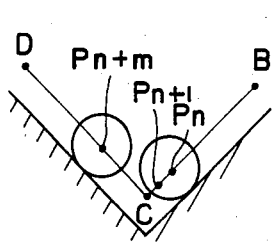 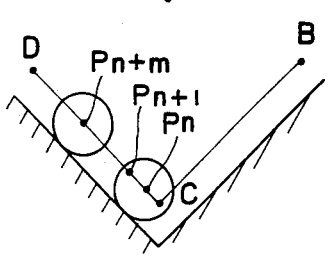 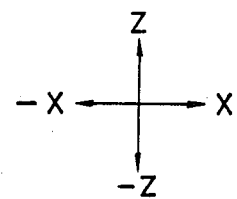

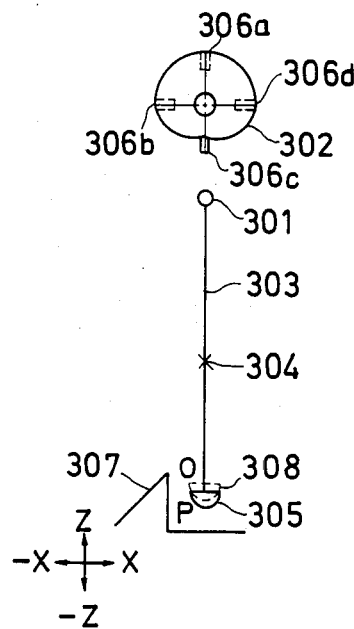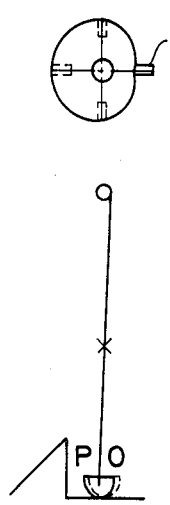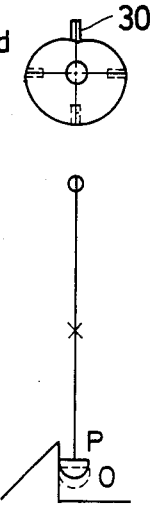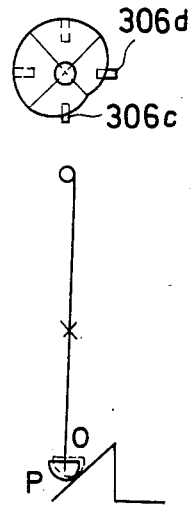
FIG.15(a) FIG.15(b) FIG.15(c) FIG.15(d)
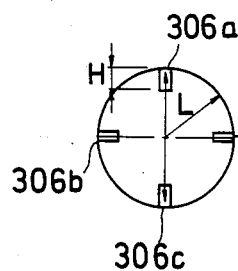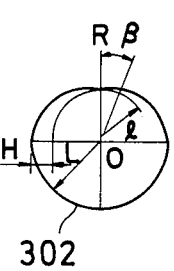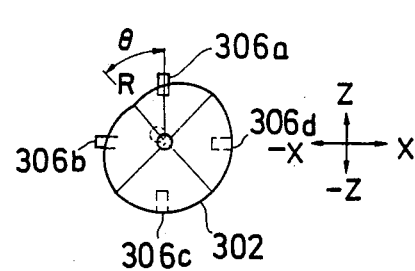
FIG.16(a) FIG.16(b) FIG.16(c)

FIG. 22(a)　　　FIG. 22(b)
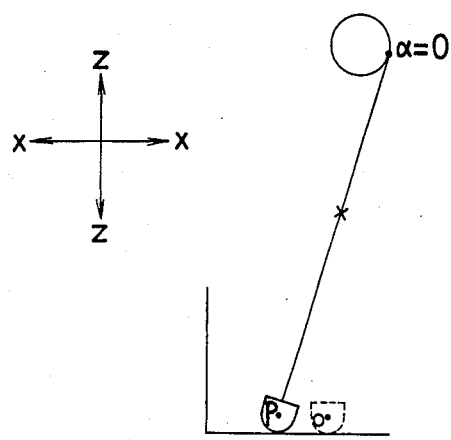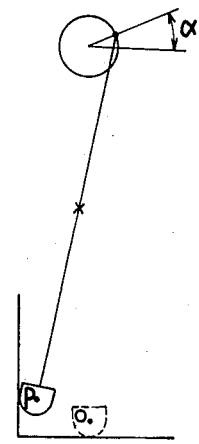
FIG. 22(c)　　　FIG. 22(d)
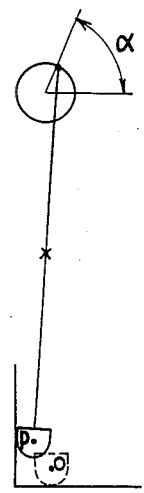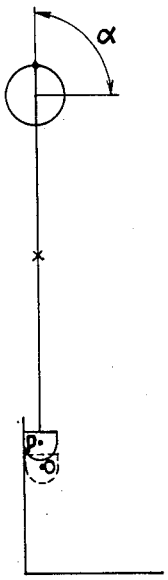

ADVANCED MEMORY TYPE PROFILING CONTROL METHOD FOR A MACHINE TOOL

INDUSTRIAL FIELD OF UTILIZATION

The present invention relates to an advanced memory type profiling control method of a machine tool.

The profiling control processing is used for processing or working an object work with the same shape and accuracy as those of a model using a diesinking machine, a vertical type machining center and another machine tool. The object work may be, by way of example, a plastic mold for molding, a mold for use in pressing in an automobile and the like.

A profiling control mechanism is composed of a tracer which moves a stylus, that is, a contact element along a surface of the model, a controller for the tracer, a machine body which is moved on the basis of a signal from the tracer and a control unit for the machine body. The machine body is equipped with a cutting tool such as an end mill and cuts a work to a shape of the model in accordance with movement of the tracer along the model surface.

Such a prior art profiling control mechanism can be classified into two types.

A first type profiling control mechanism includes a tracer and a machine body which are mechanically coupled with each other so that the tracer and the machine body are operated correspondingly at the same time. In this mechanism, the mechanical coupling signifies, for example, that the tracer is mounted on a spindle head of the machine body through a mechanical member such as an arm and an end mill (cutting tool) mounted on the spindle of the machine body and the tracer are interlocked correspondingly at the same time.

A second type profiling control mechanism includes a tracer and a machine body which are electrically coupled with each other so that the tracer and the machine body are operated correspondingly at the same time. The electrical coupling signifies that a drive unit of the machine body and a drive unit of the tracer are independent and the tracer is driven along the model surface, a difference between a position of the tracer and a position of the machine body being detected by an optical position detector or an angle detector so that the machine body is controlled to follow movement of the tracer on the basis of a signal from the detector.

PRIOR ART

An example of a tracer used in the profiling control is described with reference to FIGS. 1(a)–1(d) to 3.

Referring to FIG. 1(a), a spindle 101 is provided with a stylus 102 which is brought into contact with a model 103. The spindle 101 is guided in a lever 104 in Z-axis (normal line) direction by means of a ball guide 105. The spindle 101 is further supported in Z-axis direction by a spring 106. Adjustment is made so that an output of a differential transformer 107 is equal to zero in a condition where a weight of the spindle 101 and a tension of the spring 106 are balanced. A displacement of the stylus 102 to the lever 104 in the Z-axis direction produced by contact of the stylus 102 with the model 103 is detected by the differential transformer 107. The lever 104 is rotatably supported to a ball seat 108. When the stylus 102 is tilted to the Z-axis, the tilted angles $\alpha$ and $\beta$ are detected by the differential transformer 109x and a differential transformer 109y disposed perpendicularly to the transformer 109x.

A manner of controlling the profiling operation by the tracer to the model 103 is now described.

Assuming that there is no displacement of the stylus in the Y-axis direction, a velocity command vector of the tracer is determined by a displacement $e_x$ in the X-axis direction and a displacement $e_z$ in the Z-axis direction of the stylus 102 in regard to a central point T of the ball seat 108. The displacement $e_z$ is obtained from the differential transformer 107 and the displacement $e_x$ is obtained from the transformer 109x. Supposing that a deviation vector of the stylus 102 to the point T is $e = (e_x, e_z)$, a tracer control unit determines a magnitude and a direction of the velocity command vector of the tracer as follows (refer to FIG. 2).

When $|OE| = |e| \leq \Delta e$, a velocity command in the downward direction, that is, in the Z-axis direction is given unconditionally.

When $|OE| = |e| > \Delta e$, the velocity command vector of the tracer is $Vc = Vo + V_m$, where the vector $V_m$ is a vector having a magnitude proportional to a difference between OE and a circle having a radius $e_o$ and a center O and having the same direction as that of OE in the case of $|e| < e_o$ (FIG. 2) and the opposite direction to that of OE in the case of $|e| > e_o$ (FIG. 3), and the vector Vo is a vector having a direction perpendicular to that of OE and a constant magnitude.

The plus and minus signs for $e_x$ and $e_z$ are determined as follows:
  $e_x$: the sign is minus when the stylus 102 is moved in the plus direction of X-axis.
  $e_z$: the sign is minus when the stylus 102 is moved in the plus direction of Z-axis.

In the prior art, the radius of the stylus 102 is larger than the radius of the end mill by $e_o$.

$e_o$ is named a set displacement quantity and is provided in order to sufficiently effect deceleration when the direction of movement is changed.

FIG. 1(b) shows the stylus 102 being in contact with the model 103 with the tracer falling down. In this condition, since $e_z < 0$, the movement in the minus direction of X-axis is started. The movement in the Z-axis direction is gradually decelerated, and when there is no frictional resistance between the stylus 102 and the model 103, the horizontal profiling operation is performed in the state of $e = (0, -e_o)$.

FIG. 1(c) shows the stylus 102 being in contact with the vertical surface of the model 103 and moved in the X-axis direction to be $e_x < 0$. In this condition, the direction of the velocity command vector of the tracer is gradually converted upward as shown in FIG. 3 and the tracer begins to move in the plus direction of the Z-axis, so that the tracer moves along the vertical surface of the model finally as shown in FIG. 1(d).

The machine body equiped with the end mill is moved concurrently and correspondingly to the above operation of the tracer since the machine body is mechanically or electrically coupled with the tracer.

The prior art profiling control mechanism described above has the following deficiencies.

(1) A profiling error of the tracer itself to the model due to the inertia of the machine and delay of a servosystem is unavoidable. The profiling error of the tracer to the model is detected on the basis of displacement of the stylus to the tracer. Correction of a locus for the tracer is effected by the detection of the profiling error. Since the machine body is driven to be moved correspondingly to the tracer, the profiling error is unavoidable in principle.

(2) A contact frictional resistance produced between the stylus and the model deviates the stylus and the profiling error of the tracer for the model is caused.

(3) When the profiling speed of the tracer or the machine body to the model is increased and particularly when the profiling direction is changed suddenly, the profiling error as described above is particularly apparent. However, the prior art profiling control mechanism has no function that variation or deviation in the profiling direction is detected in advance to effect decelaration sufficiently so that the profiling direction is corrected exactly.

It is a first object of the present invention to provide an advanced memory type profiling control method capable of performing profiling operation with high accuracy at a high speed.

With a view to minimize the above deficiencies, the following advanced detection type tracer is provided and is described with reference to FIGS. 15 and 16.

FIGS. 15(a), (b), (c) and (d) schematically illustrate configuration and operation of the advanced detection type tracer. FIGS. 16(a), (b) and (c) illustrate a direction designation plate shown in FIG. 15.

In FIG. 15, an eccentric shaft 301 and a direction designation plate 302 are coupled with each other by a common rotary shaft not shown and are rotated by a DC motor not shown. A spindle 303 is rotatably supported around a fulcrum 304 and includes a top end coupled with the eccentric shaft 301 through a bearing. A stylus disposed at a lower end of the spindle 303 is moved to depict a circular arc with the rotation of the eccentric shaft 301. Four photodiodes 306a, 306b, 306c and 306d are disposed in opposed relationship to the direction designation plate 302. The photodiodes 306a, 306b, 306c and 306d are in contact with a circle having a radius of L and disposed along the X-axis and Z-axis with a length thereof in the radial direction of H.

A drive direction of the machine is determined to an intermediate direction of the Z-axis direction and X-axis direction in accordance with signals from the photodiodes 306a, 306b, 306c and 306d.

In FIG. 15, when the stylus 305 is moved in contact with the model 307, the stylus 305 is controlled by a DC motor not shown which rotates the eccentric shaft 301 so that the stylus 307 is pressed to the model 307 by a constant force. A broken line 308 shown in FIG. 15(a) represents an end mill (being imagined) corresponding to the stylus 305. Supposing that an eccentric quantity of the eccentric shaft 301 is $\epsilon$, the stylus 305 of the tracer shown in FIGS. 15 and 16 precedes to the end mill 308 by $\epsilon$ in the profiling direction at all times.

This operation is now described.

In FIG. 15(a), the eccentric shaft 301 is deviated downward and the machine body is thus moved downward, that is, in the minus direction of the Z-axis by a signal of the photodiode 306c. Accordingly, the tracer coupled mechanically with the machine body is also moved downward. The stylus 305 precedes to the end mill 308 by $\epsilon$. When the stylus 305 is brought in contact with the model 307 thereafter, the stylus 305 is pressed up by the reaction from the model 307 and the eccentric shaft 301 is rotated counter-clockwise to be in a state shown in FIG. 15(b). At the same time, the direction designation plate 302 is also rotated counter-clockwise and a signal from the photodiode 306d is utilized instead of the signal from the photodiode 306c. The direction of the velocity vector in the machine body changes from $-Z$ to $-X$ gradually.

In the state of FIG. 15(b), the horizontal profiling operation in the $-X$ direction is performed. While the stylus 305 is pressed against the model 307 by a constant force, the stylus 305 is moved along the model 307 with the stylus 305 preceding to the end mill 308 by $\epsilon$.

When the stylus 305 is brought in contact with the vertical surface of the model after the horizontal profiling operation, the stylus 305 receives reaction in the horizontal direction. Consequently, the eccentric shaft 305 is rotated counter-clockwise to change the direction of the velocity vector from the $-X$ direction to the Z direction and the profiling operation is performed along the vertical surface as shown in FIG. 1(c). In this vertical profiling operation, the stylus 305 precedes to the end mill 308 by $\epsilon$. FIG. 1(d) illustrates an inclined surface along which the profiling operation is performed.

The above-mentioned advanced detection type tracer is improved to minimize the conventional deficiencies by the following operation.

(1) The NC machine and the machine controlled by the profiling operation possess a velocity deviation coefficient inherent in the machine shown in the following equation due to combination of the inertia of the machine and the performance of the control unit.

$$Ku = V/\epsilon u \qquad 1$$

where
Ku: velocity diviation coefficient
V: profiling velocity
$\epsilon u$: velocity deviation.

Accordingly, by establishing $\epsilon$ to be equal to the velocity deviation $\epsilon u$ and moving the stylus so that the stylus precedes to the end mill by $\epsilon u$ at all times, even if the profiling direction is suddenly changed at a corner, processing operation is performed with small overshoot and small overcut.

(2) Since the frictional resistance produced at a contact portion between the model and the stylus is exerted as reaction to the eccentric shaft in the central direction thereof, the frictional resistance prevents extra displacement of the stylus as small as possible.

The advanced detection type tracer has the above-described excellent points but possesses the following defficiiencies.

A first deficiency is that the velocity deviation $\epsilon u$ is different depending on a magnitude of the profiling velocity V and a drive axis (drive direction) of the machine side. In the conventional advanced detection type tracer, while the preceding quantity of the stylus to the end mill is established to a constant value mechanically, it is necesary at times to change the profiling velocity depending on material of a work and processing condition and to change characteristics of drive shafts of the machine. Further, the characteristics of the drive shafts of the machine are different and processing accuracy is insufficient if the preceding quantity is fixed.

A second deficiency is that the processing accuracy at a corner in which the profiling direction is suddenly changed is not sufficient as described below. In the conventional advanced detection type tracer, when the direction of the velocity command vector of the machine changes from the horizontal profiling to the vertical profiling due to displacement of the stylus and the resultant rotation of the eccentric shaft, the direction of the velocity command vector rotates 90°. However, the magnitude of the velocity command vector is constant during this rotation. Accordingly, a command to move the machine body along a locus of a circular arc having a predetermined radius defined by ε (preceding quantity) is given and uncut portion is produced. In order to prevent this uncut portion, when ε is made small, overcut portion occurs. In order to process a corner portion with accuracy, an NC machine tool has an exact stop check function (in which a movement command for switching the processing direction is issued after decelerating to stop at the direction switching point in the corner and confirming that positioning accuracy is a predetermined value) and the processing direction is switched after reaching the direction switching point while decelerating sufficiently in the corner portion. While it is desirable that the profiling tracer has a function similar to the exact stop check function of the NC machine tool, since the magnitude of the velocity command vector of the conventional advanced detection type tracer is not changed and only the direction thereof is changed, the processing accuracy in the corner portion is not sufficient and particularly its tendency is remarkable when the profiling velocity is large.

It is a second object to provide an advanced detection type tracer capable of performing profiling processing at a high speed with high accuracy.

SUMMARY OF THE INVENTION

The profiling control method according to an aspect of the present invention for use in a machine tool including a tracer which is relatively moved along a surface of a model and a machine body provided with a cutting tool such as an end mill whereby a work having the same shape as that of the model is made, is characterized by the provision of driving the tracer along the model surface with the tracer preceding the machine body by a predetermined time, sampling coordinate data of a position of the tracer and data of displacement of a stylus, which is moved in contact with the model surface, to the tracer at a predetermined sampling time, calculating coordinate values of points on a locus formed by movement of a central point of a stylus ball on the basis of the sampled data, calculating a coordinate value of a point following the central point of the stylus ball at retard, for each sampling time to obtain a position command data to the machine body, storing the position command data to a memory succesively, and supplying the stored data to a drive control unit of the machine body successively with a predetermined delay time after storing the data.

In the present invention, the mechanical or electrical coupling as in the prior art, in which the tracer and the machine body are moved concurrently and correspondingly, is removed. The tracer is moved along the model by a separate drive unit and control unit which are different from a drive unit of the machine body while preceding the machine body by a predetermined time. Data of a command position or a command velocity of the drive unit of the machine body for performing the profiling operation exactly are calculated in real time by an arithmetic unit such as a computer on the basis of coordinate information of a position of the tracer and information concerning displacement (inclined angle and the like) of the stylus and are stored in a memory. Thereafter, the movement of the machine body is controlled on the basis of the stored data from a time later than the beginning time of the movement of the tracer by a predetermined time (for example, from a time when the number of stored data reaches a predetermined value). This operation is a novel point which does not exist in the prior art and hence is a reason why the advanced memory type profiling method is named. The concept of the precedence and the delay of the predetermined time includes a state that the profiling operation by the tracer along the model surface is all completed prior to the movement of the machine body. In this case, it is required to provide a large capacity memory as the memory. However, when identical works are repeatedly processed, it is not required to perform the profiling operation along the model again and the processing is repeatedly controlled on the basis of the data stored in the memory.

In the advanced memory type profiling method according to another aspect of the present invention for use in a machine tool including a tracer having a top provided with a stylus ball which is moved along a model and a machine body which is controlled on the basis of information of a position of the tracer and is provided with an end mill for cutting a work to the same shape as that of the model, the stylus ball is moved along the model while preceding the end mill by a predetermined time, or the end mill is driven after completion of all the profiling operation of the stylus ball. A coordinate value for each sampling time on a locus of a central point of the stylus ball and an average velocity vector of the central point of the stylus ball for each sampling time within a predetermined time are calculated by an arithmetic processing unit and the calculated data of the arithmetic processing unit is stored in a memory. The arithmetic processing unit produces a command signal for moving the end mill between points on the locus formed by movement of the central point of the stylus to the drive control unit of the machine body for driving the end mill. The movement of the command signal is made equal to a movement vector connecting between the points and the magnitude of the movement velocity is determined in accordance with a sign of a product value for each component of the average velocity vector and the movement vector and a magnitude of components of the average velocity vector so that the arithmetic processing unit moves sequentially the end mill by the command signal from a point to a point on the locus.

In the advanced memory type profiling control method according to still another aspect of the present invention, there are provided a spindle having one end provided with a stylus ball moving along the model and the other end linked to an eccentric shaft and which is supported on a rotatable and swingable fulcrum, a machine body which is controlled on the basis of a position information of the stylus ball and provided with an end mill for cutting a work to the same shape as that of the model, an eccentric shaft rotation control unit for driving the stylus ball along the model while preceding the end mill by a predetermined value by controlling the rotation of the eccentric shaft, an arithmetic unit for sampling a position coordinate of the stylus ball and a phase value of the rotational angle of the eccentric shaft at a predetermined sampling time to calculate a coordinate value for each point on a locus of the stylus ball, and a memory for storing data calculated by the arithmetic unit.

When the arithmetic unit supplies a command signal for moving the end mill from a point to an adjacent point on the locus for each sampling time to the control drive unit of the machine body for driving the end mill sequentially, the movement of the command signal is made equal to a vector value connecting the adjacent points on the locus and the magnitude of the moving velocity is determined on the basis of the phase of the rotational angle of the eccentric shaft.

BRIEF DESCRIPTION OF THE EMBODIMENT

FIGS. 1(a)-1(d) show cross-sections illustrating operation of a tracer for use in the profiling control;

FIGS. 2 and 3 schematically illustrate velocity command vector in the prior art profiling control;

Figure 6:
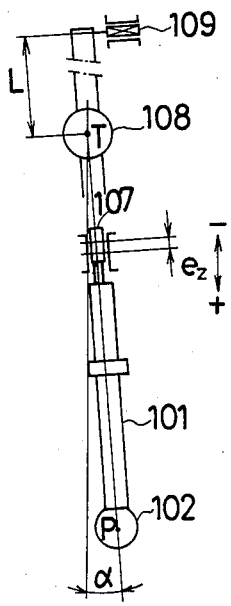
FIG. 6 is an elevation conceptually illustrating operation of a tracer in the unit of FIG. 4.
Figures 7A, 7B:
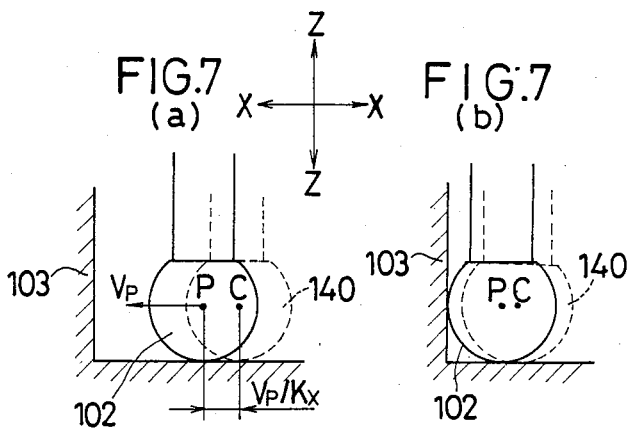
Figure 9:
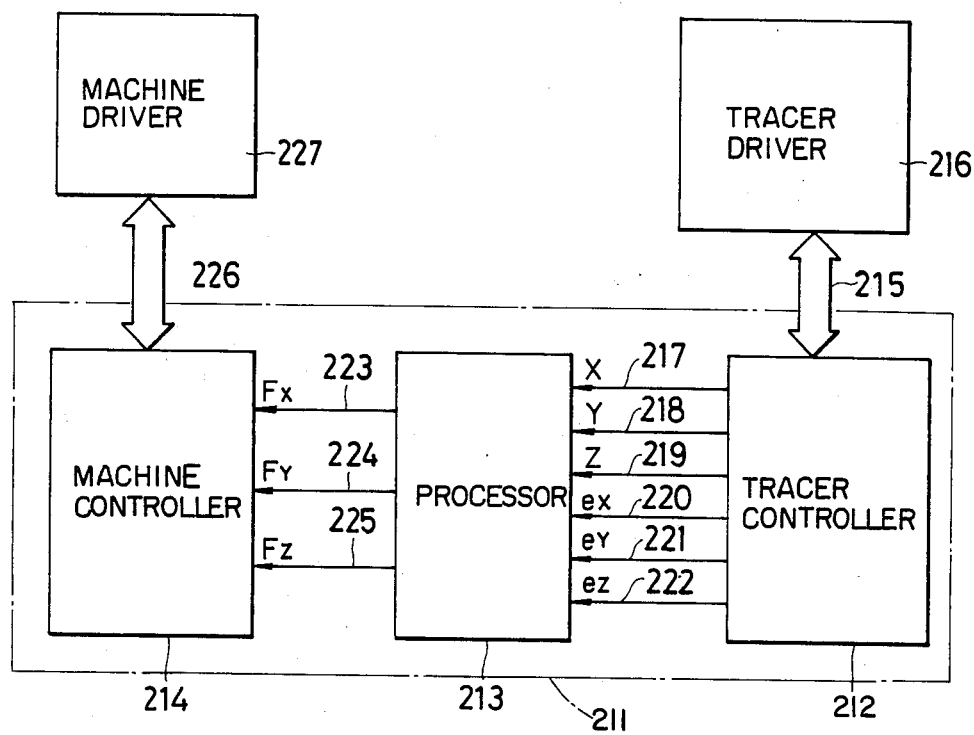
Figure 10:
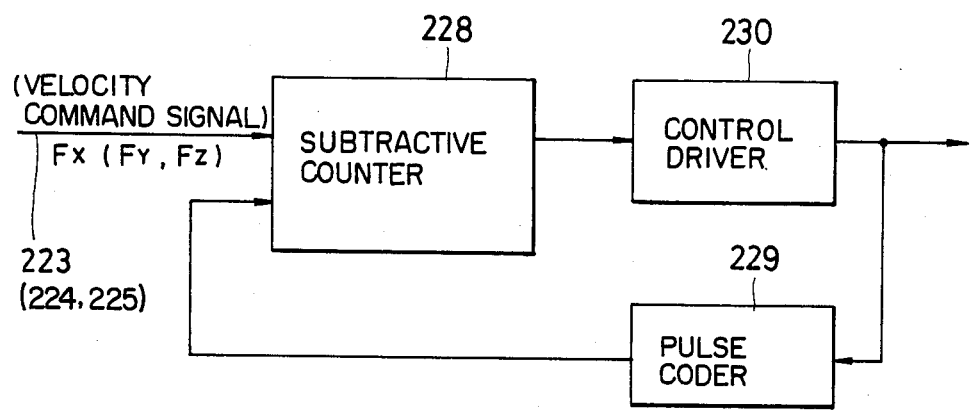
Figure 11:
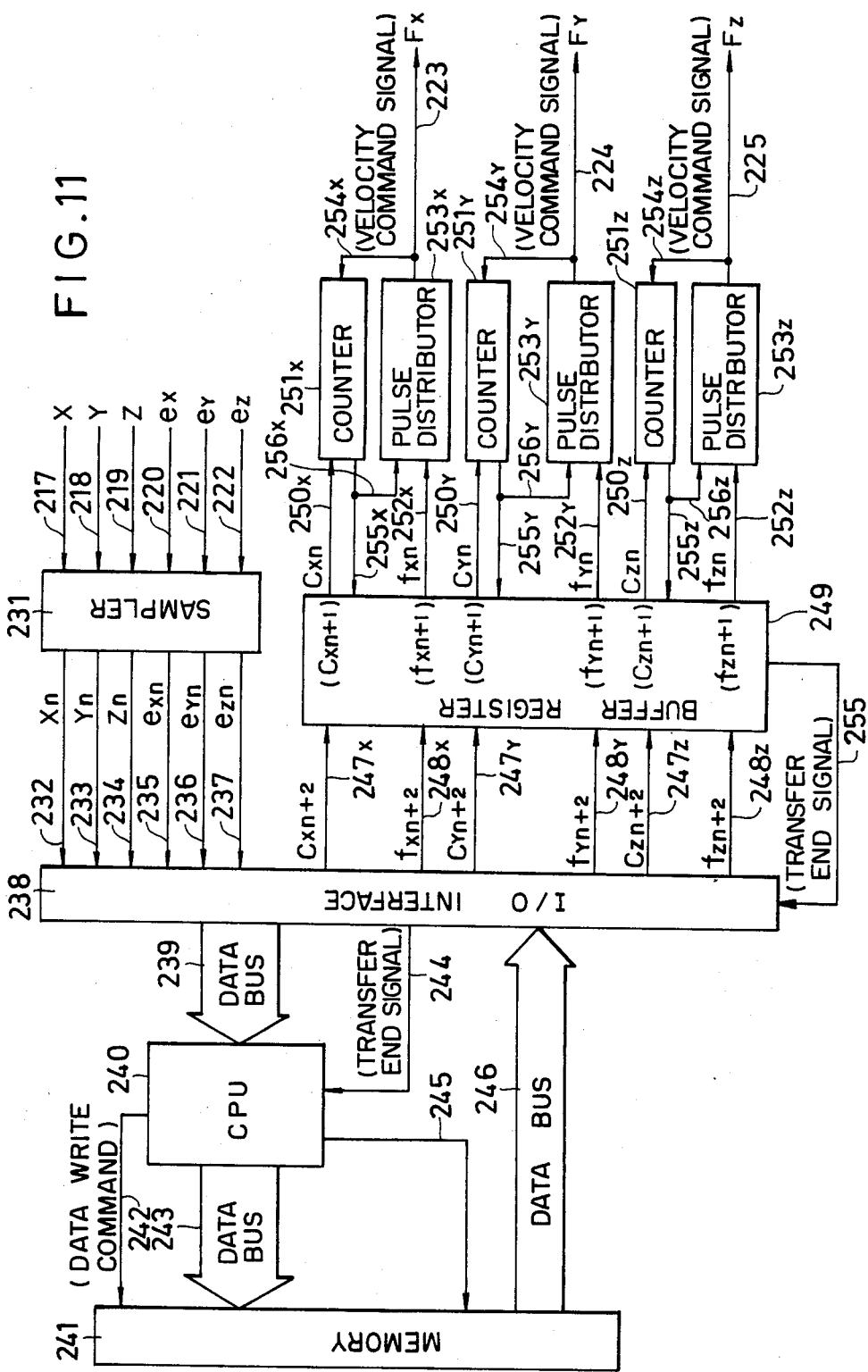
Figure 17:
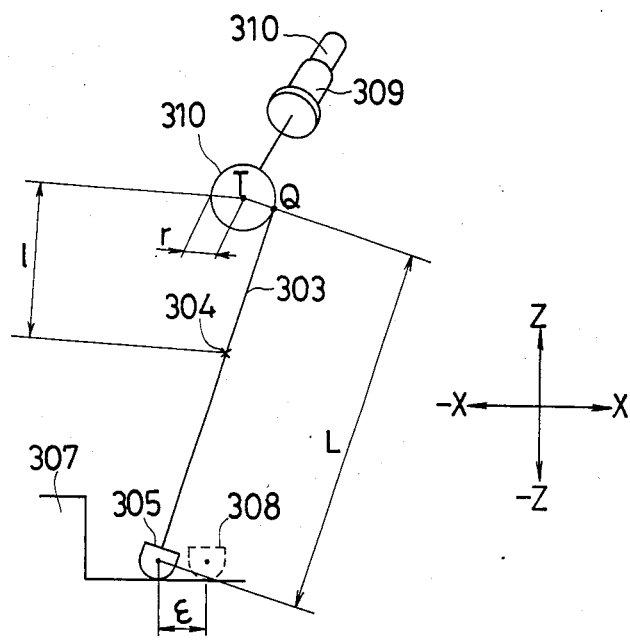
Figure 19:
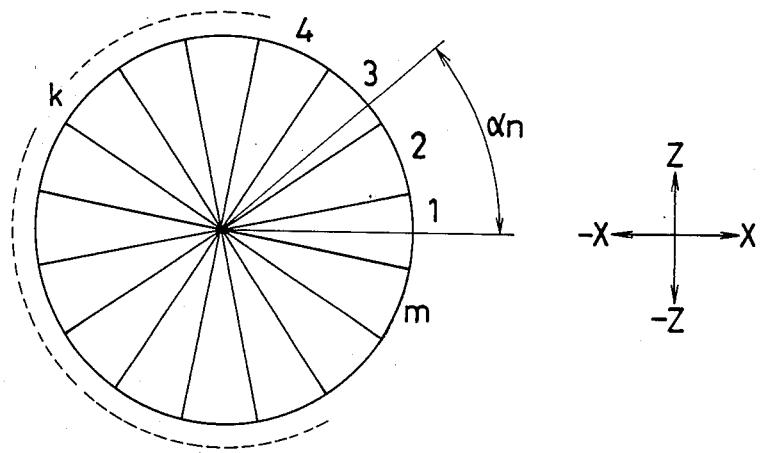
Figure 18:
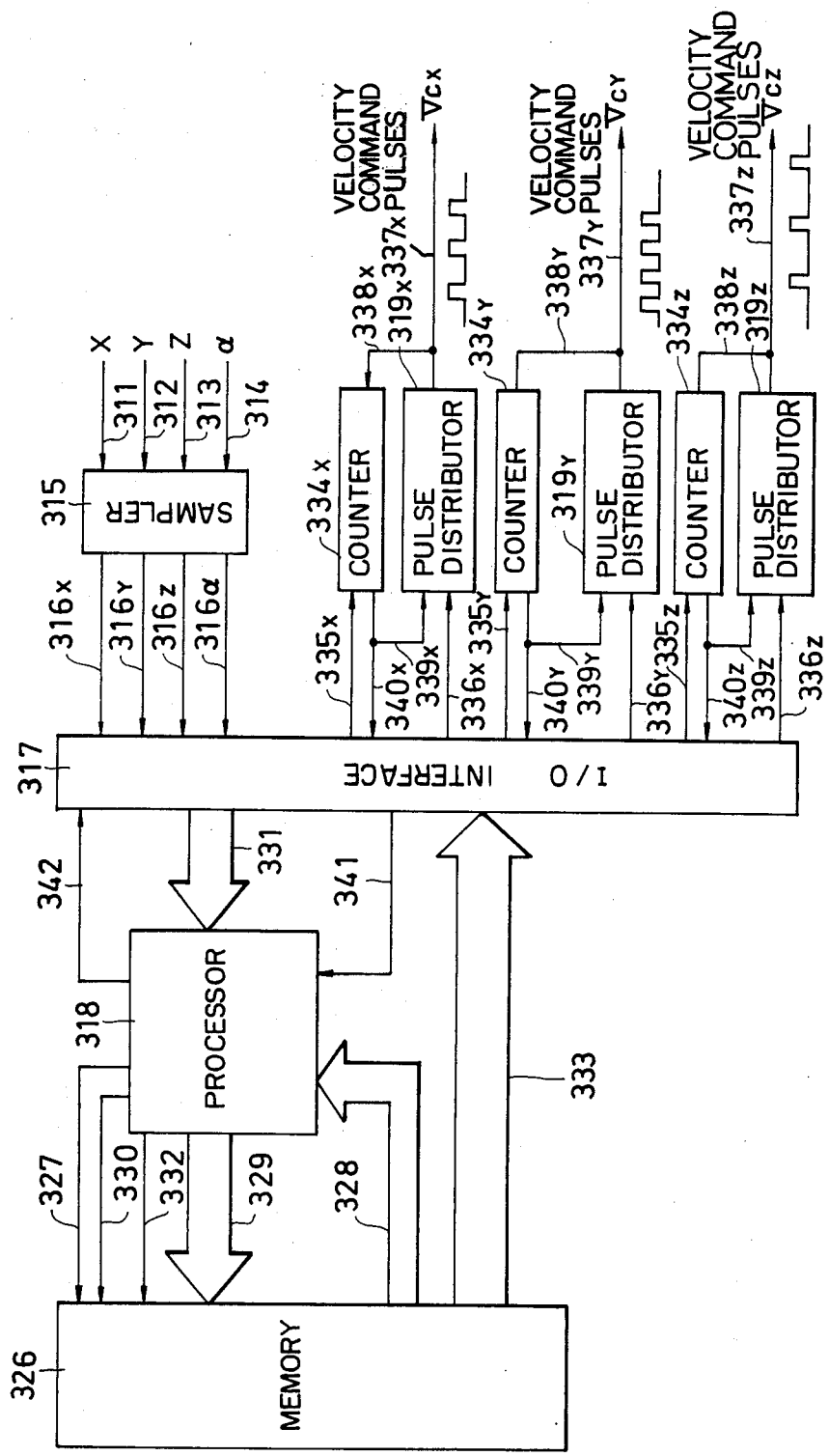
Figure 20:
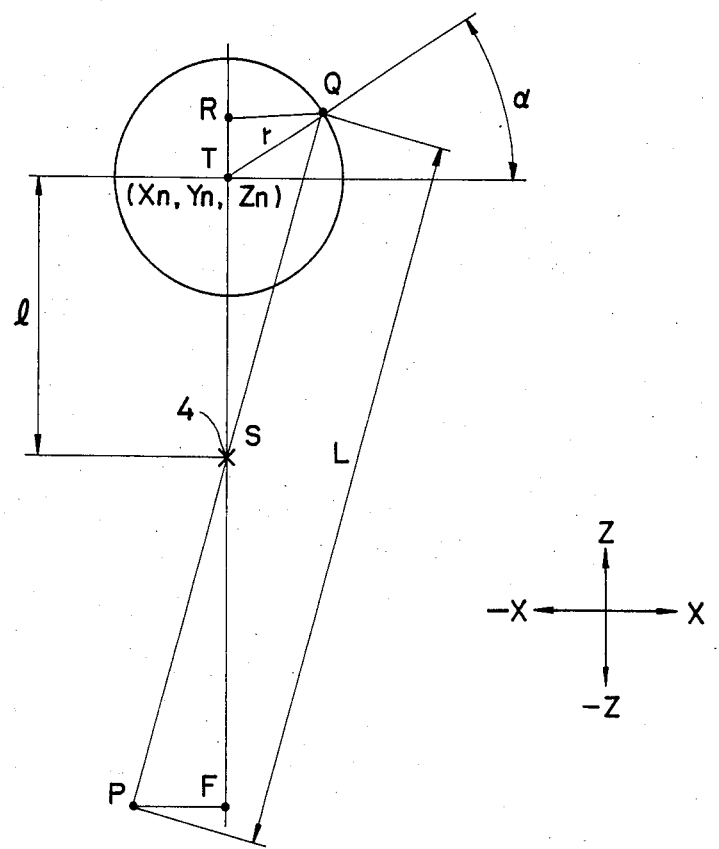
Figure 21:
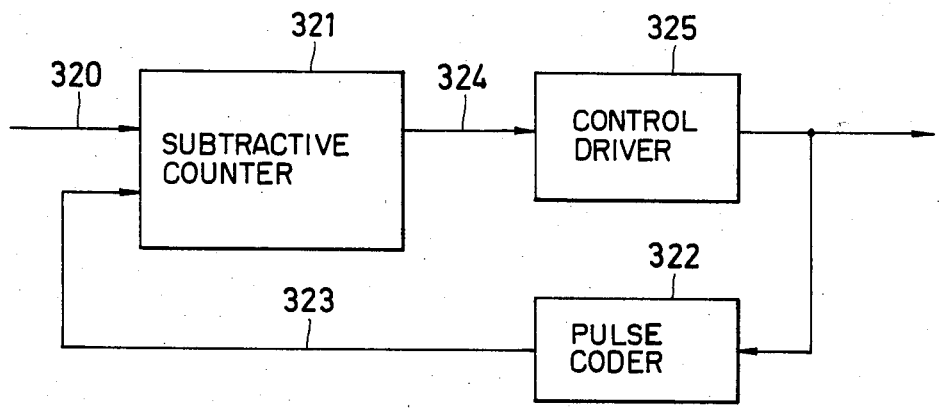
Figure 23:
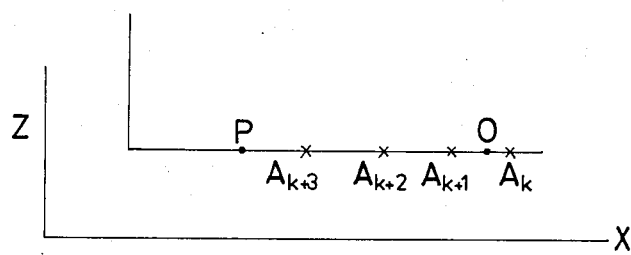
Figure 23:
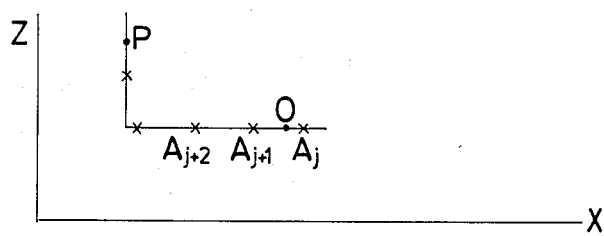
Figure 23:
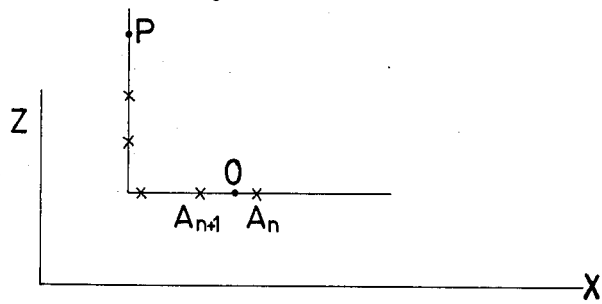

FIGS. 7(a) and 7(b) are enlarged views of a stylus of the tracer of FIG. 6;

FIGS. 8(a)-8(d) show cross-sections of a tracer used to implement a method according to a second embodiment of the present invention;

FIG. 9 is a block diagram of a control unit used to implement the method according to a second embodiment of the present invention;

FIG. 10 is a block diagram of a drive unit and a control unit in the unit of FIG. 9;

FIG. 11 is a block diagram of a processor in the unit of FIG. 9;

FIGS. 12(a)-12(c) are flow charts for determining fxn, fyn and fzn in the unit of FIG. 9;

FIGS. 13(a)-13(d) schematically illustrate operation of a stylus when the stylus is moved along from a horizontal surface to a vertical surface by using the unit of FIG. 9;

FIGS. 14(a)-(e) schematically illustrate operation of the stylus when the stylus is moved along an inclined corner by using the unit of FIG. 9;

FIGS. 15(a)-15(d) conceptually illustrate a configuration and operation of an advanced detection type tracer;

FIGS. 16(a)-16(c) show a direction designation plate of the tracer of FIGS. 15(a)-15(d);

FIG. 17 schematically illustrates an advanced detection type tracer used to implement a method according to a third embodiment of the present invention;

FIG. 18 is a block diagram of a control unit used to implement the method according to the third embodiment of the present invention;

FIG. 19 illustrates an angular range of $\alpha_n$ for determining a frequency of a velocity command pulse;

FIG. 20 illustrates a geometrical configuration of a tracer of FIG. 17;

FIG. 21 is a block diagram of an NC servo driver of a machine body;

FIGS. 22(a)-22(d) conceptually illustrate operation of the tracer of FIG. 17; and FIGS. 23(a)-23(c) illustrate loci of point P of FIGS. 22(a)-22(d).

PREFERRED EMBODIMENTS OF THE INVENTION

An embodiment of an advanced memory type profiling control method according to a first aspect of the present invention is now described with reference to drawings.

Figure 2:
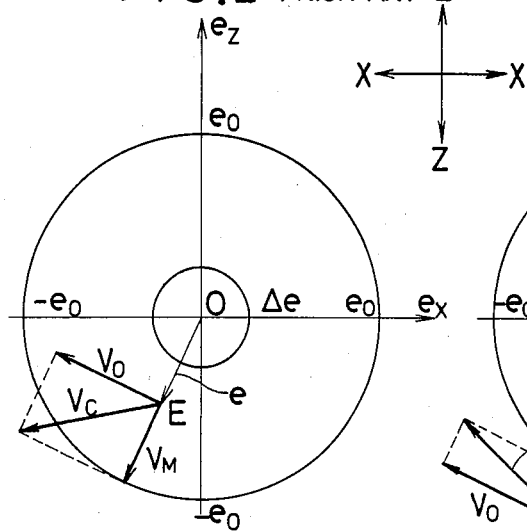
Figure 3:
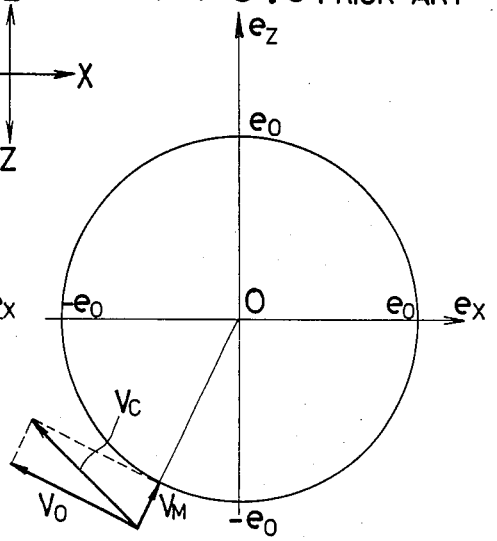

A structure of a tracer and a profiling control mechanism of the tracer for a model are the same as the prior art described in FIGS. 1 and 2. However, a radius of an end mill used in the present embodiment is the same as that of a stylus ball. (Since the end mill follows a locus of the stylus with a predetermined delay, it is required that both radii are the same.)

Figure 4:
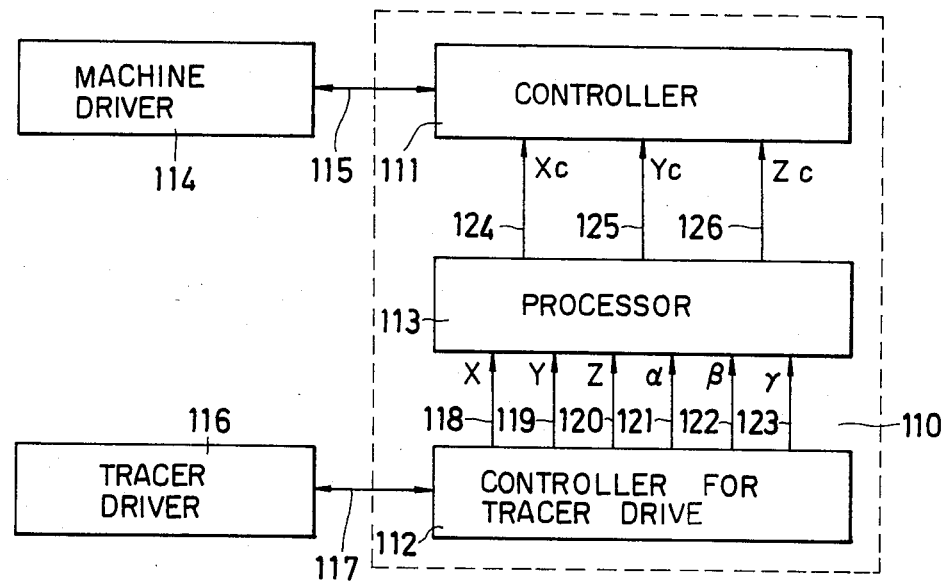
FIG. 4 is a block diagram of a control unit used to implement a method according to a first embodiment of the present invention.

FIG. 4 shows a configuration of a whole control unit.

A control unit 110 is composed of a controller 111 for the machine body, a controller 112 for a tracer drive and an arithmetic unit 113. A driver 114 for the machine body and the controller 111 therefor perform input/output operation of a positional signal and drive power through a transmission path 115. In the same manner, a driver 116 for the tracer and the controller 112 therefor perform input/output operation of a positional signal and drive power through a transmission path 117. The controller 112 for the tracer drive supplies digitized data of positional coordinates X, Y and Z (orthogonal system) of the tracer, inclined angles $\alpha$ and $\beta$ of the stylus to the X-axis and Y-axis, respectively, and displacement $e_x$ of the stylus to the arithmetic unit 113 through signal lines 118 to 123, respectively. The arithmetic unit 113 supplies command position data Xc, Yc and Zc of the machine body to the controller 111 for the machine body through signal lines 124, 125 and 126, respectively.

Figure 5:
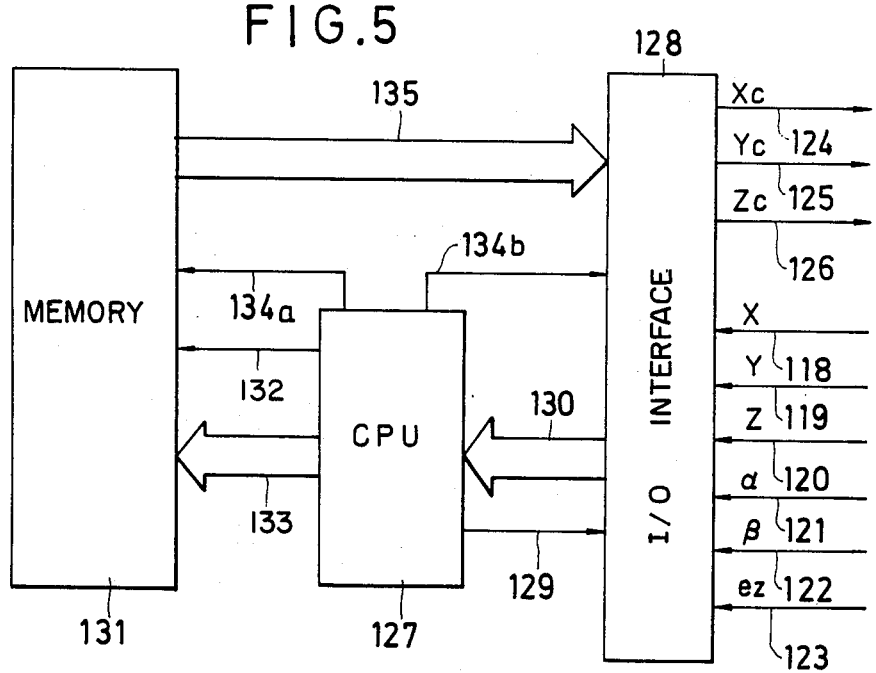
FIG. 5 is a block diagram of an arithmetic unit in the control unit of FIG. 4.

FIG. 5 shows a configuration of the arithmetic unit 113.

A CPU (Central Processing Unit) 127 applies a data fetch command to an input/output interface 128 through a signal line 129 at a predetermined sampling time and receives data of the positional coordinates X, Y and Z of the tracer and the inclined angles $\alpha$ and $\beta$ and the displacement $e_z$ of the stylus through a data bus 130 at each sampling time. The CPU 127 calculates command position coordinates Xc, Yc and Zc of the machine body and supplies a write command signal to a memory 131 through a signal line 132 so that the command position coordinates Xc, Yc and Zc calculated at each sampling time are sequentially stored in the memory 131 through a data bus 133.

When the number of set data (Xc, Yc, Zc) stored in the memory 131 reaches a predetermined value, a data read command and a data output command are produced from the CPU 127 through signal lines 134a and 134b. The data (Xc, Yc, Zc) for each sampling time stored in the memory 131 are transferred to the input/output interface 128 through a data bus 135 sequentially at intervals of the sampling time $\Delta$ts and further supplied to the controller 111 for the machine body through the signal lines 124, 125 and 126.

Operation of the present embodiment is now described. In FIG. 1, the position coordinates of the tracer are represented by the central point T of the ball seat 108 and the coordinates of the point T are represented by (X, Y, Z). Considering two-dimensional profiling operation in the X-Z plane, Y is constant. When the displacement $e_z$ of the stylus 102 to the lever 104 is zero, a length TP is l where P is a central point of the stylus ball and the stylus ball has the same diameter as that of the end mill.

An inclined angle of the lever 104 detected by the differential transformer 109x is $\alpha$ as shown in FIG. 6.

Supposing that the plus and minus signs of the displacement $e_z$ of the differential transformer 107 assume a direction shown in FIG. 6, if the coordinates (X, Y, Z)

of the point T are given, coordinates (Xp, Yp, Zp) of the central point P of the stylus ball are given by:

$$Xp = X - (l + e_z)\sin\alpha \\ Yp = Y \\ Zp = Z - (l + e_z)(1 - \cos\alpha)  \quad (1)$$

On the other hand, supposing that displacement of the differential transformer 109x detecting the inclined angle $\alpha$ is $\Delta X$ and a length from the point T to a mounting position of the differential transformer 109x is L, $\sin \alpha \approx \Delta X/L$.

Generally, since $\alpha$ is small, $\sin \alpha \approx \alpha$ and $\cos \alpha \approx 1$. Therefore, the above equations (1) are approximated as follows:

$$Xp \approx X - l\alpha - e_z\alpha \\ Yp = Y \\ Zp \approx Z \quad (2)$$

In the same manner, when $\beta \neq 0$, the above equations are approximated as follows:

$$Xp \approx X - l\alpha - e_z\alpha$$
$$Yp \approx Y - l\beta - e_z\beta$$
$$Zp \approx Z$$

Assuming that a time when the tracer begins to be driven is $t_o$, a time interval (sampling time) of fetching data X, Y, Z, $\alpha$, $\beta$ (=0) and $e_z$ is $\Delta ts$ and coordinates of a point P calculated from values X, Y, Z, $\alpha$ and $e_z$ at a time $t_o + n\cdot\Delta ts$ (where n is a positive integer) are (Xpn, Ypn, Zpn), the CPU 127 calculates command position data (Xcn, Ycn, Zcn) of the machine body.

$$Xcn = Xpn - \frac{Xpn - Xpn - m}{Kx \cdot m \cdot \Delta ts} \\ Ycn = Ypn - \frac{Ypn - Ypn - m}{Ky \cdot m \cdot \Delta ts} \\ Zcn = Zpn - \frac{Zpn - Zpn - m}{Kz \cdot m \cdot \Delta ts} \quad (3)$$

where m is an integer having a relation $n - m > 0$. Kx, Ky and Kz are constants determined in consideration of inertia of the machine body and delay of the servo system.

When the stylus abuts against the vertical surface of the model and suddenly stops after the horizontal profiling operation, if the command position data of the machine body is (Xcn, Ycn, Zcn)=(Xpn, Ypn, Zpn) as in the prior art, the machine body overshoots greatly in response to the sudden stop command and produces a largely overcut portion. On the contrary, in the profiling operation using the above equation (3), the coordinate value of the point following the central point P of the stylus ball with a predetermined delay is the command position data of the machine body and accordingly even if the profiling direction is suddenly changed, moderate deceleration is performed.

In FIG. 7(a), the stylus 102 is moved along the model 103 in the horizontal direction at a speed Vp while coming into contact with the model 103. The central point C of the ball of the end mill 140 (being imaged) receives a position command data following the central point P of the stylus ball with delay of Vp/Kx. FIG. 7(b) shows the stylus stopped suddenly by abuting against the vertical surface of the model.

The point P is at a standstil until the profiling operation by the stylus along the vertical surface is started and the X-axis coordinate value of the point P at this time is not changed. Thereafter, while the profiling operation along the vertical surface is performed, the X-axis coordinate value of the point P is not changed. Accordingly, considering that the stylus comes into contact with the vertical surface of the model at the time $t_o + n\cdot\Delta ts$, the following equation is formed upon transferring of the direction and the profiling operation along the vertical surface thereafter.

$$Xpn = Xpn+1 = Xpn+2 = \ldots = Xpn+k \quad (4)$$

where k is an integer. The following equations are derived from the equations (3) and (4).

$$Xcn = Xpn - \frac{(Xpn - Xpn - m)}{Kx \cdot m \cdot \Delta ts} \\ Xcn + 1 = Xpn - \frac{(Xpn - Xpn - m)}{Kx \cdot m \cdot \Delta ts} \\ Xcn + k = Xpn - \frac{(Xpn - Xpn + k - m)}{Kx \cdot m \cdot \Delta ts} \quad (5)$$

From the above equations (5), $Xpn - Xpn - m > |Xpn - Xpn - m + 1| > \ldots > |Xpn - Xpn + k - m|$ is effected for $k < m$. $Xcn+k$ approaches Xpn gradually with increasing of k and coincides with Xpn when $k = m$.

A velocity Vxn of the point C during this time is commanded to be the following velocity.

$$Vxn = \frac{Xcn+k - Xcn+k-l}{\Delta ts} \quad (6)$$

$$= \frac{X_{pn+k-m} - X_{pn+k-l-m}}{K_x \cdot m \cdot \Delta ts}$$

Supposing that $k < m$ and the point P is moved at a constant velocity Vp upon the horizontal profiling operation, the velocity Vp is given by $$Vp = \frac{X_{pn+k-m} - X_{pn+k-l-m}}{\Delta ts} \quad (7)$$

From the equations (6) and (7), the velocity Vxn is given by $$Vxn = \frac{1}{m \cdot \Delta ts}\left(\frac{Vp}{Kx}\right) \quad (8)$$

More particularly, when the moving direction of the point C is switched from the horizontal direction for the horizontal surface profiling operation to the vertical direction for the vertical surface profiling operation, the point C is moved toward the direction switch point at a speed reduced to $1/(m\cdot\Delta ts\cdot Kx)$ of the velocity Vp from the time earlier by the time of $m\cdot\Delta ts$ to the time when the direction switch point is reached.

Since the coordinate data of the point C is applied to the machine body as the command position data and the end mill is decelerated to approach the direction switch point, overcut is minimized.

As described above, in the profiling control method according to the present invention, the machine body is controlled to be moved in accordance with the model surface shape independently of a follow error of the tracer following the model, inclination of the stylus due to a frictional resistance between the stylus and the model and relative displacement to the tracer. The command position data to the machine body employs the coordinate data of the point following the central point of the stylus ball on a locus of movement of the central point of the stylus ball with delay by a predetermined value in a predetermined time proportional to an average velocity of the stylus ball. Accordingly, when the profiling direction is suddenly changed, moderate deceleraton is previously effected and processing can be performed so that overcut due to overshoot is minimized.

The advanced memory type profiling control method according to a second aspect of the present invention is described with reference to drawings.

FIG. 8 shows a configuration of the tracer used in the present invention and its operation. A spindle 202 provided with a stylus 201 is guided in Z-direction by a case 204 through a ball guide 203. Displacement $e_z$ in Z-direction of the spindle 202 to the case 204 is detected by a differential transformer 205. A weight of the spindle 202 balances with supporting force or tension of a spring 206.

The case 204 is rotatably supported by a ball seat 207 and is urged by restoring force produced by a spring (not shown) so that the case 204 is restored to a position parallel with the normal line. When the stylus 201 is moved in the X-direction and in the Y-direction, the case 204 is inclined to the normal line and differential transformers 208 and 209 detect displacement $e_z$ in X-direction and displacement $e_y$ in Y-direction from a central point T of the ball seat, respectively.

The differential transformer 209 is disposed in the perpendicular direction (in X-Y plane) to the differential transformer 208 and detects the displacement $e_y$ in the Y-direction. A distance between the central point P of the stylus ball and the point T and a distance between the point T and mounting point of the differential transformers 208 and 209 are sufficiently larger as compared with the displacements $e_x$ and $e_y$ and the displacements $e_x$ and $e_y$ of the stylus to the point T are detected by the differential transformers 208 and 209 with high accuracy.

A control mechanism which moves the tracer along a model 210 while bringing the stylus 201 into contact with the model 210 is a constant error system in the same manner as the conventional manner. That is, the tracer is driven to perform the profiling operation so that $e = \sqrt{e_x^2 + e_y^2 + e_z^2}$ is a constant value. A driver for the tracer and a driver of the machine body for moving a ball end mill (cutting tool) are independent and the tracer is moved along the model to perform the profiling operation while preceding the machine body by a predetermined time.

Figure 8A:
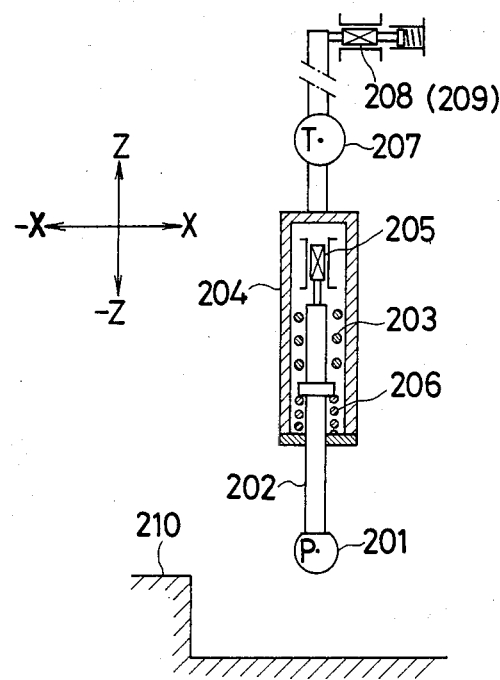
Figure 8B:
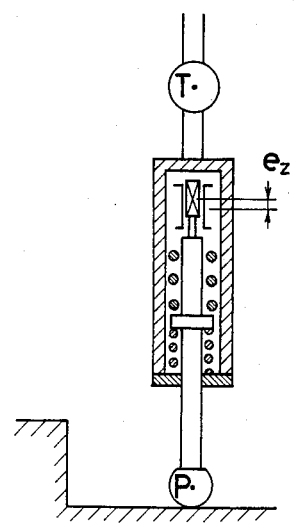
Figure 8C:
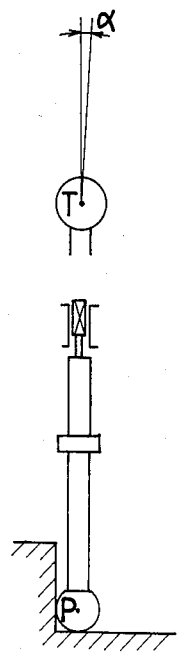
Figure 8D:
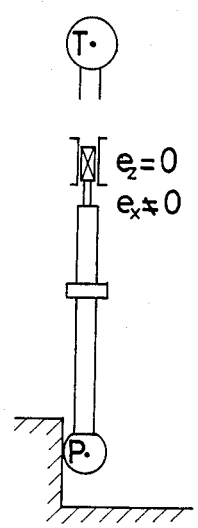

FIG. 8(a) shows a descending state of the stylus, FIG. 8(b) shows the profiling operation by the stylus on a horizontal surface, FIG. 8(c) shows a direction switching operation in the profiling operation from the horizontal surface to a vertical surface and FIG. 8(d) shows the profiling operation by the stylus along the vertical surface.

The coordinates (X, Y, Z) of the position of the tracer is represented by the coordinates of the central point T of the ball seat 207. A track of the tracer is corrected while the displacements $e_x$, $e_y$ and $e_z$ are detected as error signals by the differential transformers 205, 208 and 209. Accordingly, a locus of the central point P of the stylus ball does not always coincide with a locus of the point T. The coordinates of the central point P of the stylus ball correctly reflect the surface shape of the model.

In the present embodiment, the diameter of the stylus ball is equal to the diameter of the ball end mill and data of the locus of the central point P of the stylus ball is calculated to drive the machine body on the basis of this calculated data as described below.

FIG. 9 shows a whole configuration of a profiling control mechanism. A controller 211 comprises a tracer controller 212, a processor 213 including an arithmetic unit or a processing unit and a memory, and a machine controller 214.

The tracer controller 212 is connected to a tracer driver 216 through a transmission path 215 for signals and power. The tracer controller 212 supplies the signals concerning the position coordinates X, Y and Z of the tracer and the displacements $e_x$, $e_y$ and $e_z$ of the stylus to the tracer to the processor 213 through signal lines 217-222. The processor 213 calculates the position command data and the velocity command data for controlling the machine body on the basis of these signals and stores the calculated data in the memory included therein. The processor 213 supplies the stored data to the machine controller 214 as velocity command pulse signals Fx, Fy and Fz through signal lines 223, 224 and 225, respectively. The machine controller 214 is connected to a machine driver 227 through a transmission path 226 for signals and power.

FIG. 10 shows an actual configuration of the machine driver 227 and the controller 214.

The velocity command pulse signals Fx, Fy and Fz are applied to a substractive counter 228 through the signal lines 223, 224 and 225. The substractive counter 228 is also supplied with a feedback pulse from a pulse coder 229 forming a position detector for the machine body. The counter 228 supplies a voltage signal proportional to a difference between a count of the velocity command pulse signals and a count of the feedback pulses to a control driver 230. The control driver 230 comprises a position control amplifier, a velocity control amplifier and a DC servo-motor.

FIG. 11 shows a detailed configuration of the processor 213.

The signals concerning the position coordinates X, Y and Z of the tracer and the displacements $e_x$, $e_y$ and $e_z$ of the stylus to the tracer are applied to a sampler 231 through the signal lines 217, 218, 219, 220, 221 and 222. The sampler 231 samples these signals at a constant sampling time $\Delta t_s$. Assuming that values of the data X, Y, Z, $e_x$, $e_y$ and $e_z$ at a time $t_o + n \cdot \Delta t_s$ (where n is an integer) are Xn, Yn, Zn, $e_{xn}$ $e_{yn}$ and $e_{zn}$, these data are supplied to an I/O interface 238 through signal lines 232 to 237 and further supplied from the interface to a central processing unit (CPU) 240 through a data bus 239.

The CPU 240 calculates coordinates (Xpn, Ypn, Zpn) of the central point P of the stylus ball at the time $t_o + n \cdot \Delta t_s$ on the basis of the data Xn, Yn, Zn, $e_{xn}$, $e_{yn}$ and $e_{zn}$ in accordance with the following equations.

$$Xpn = Xn + e_{xn} \quad (9)$$

$$Ypn = Yn + e_{yn}$$

$$Zpn = Zn + e_{zn} - l$$

where l is a distance between the central point P of the ball seat and the point P when $e_{zn}=0$.

Further, the CPU 240 calculates average velocity vector (Vpxn, Vpyn, Zpzn) of a point P between the time $t_o + n \cdot \Delta ts$ and a time $t_o + (n+m) \cdot \Delta ts$ (where m is an integer) in accordance with the following equations.

$$\left. \begin{array}{l} Vpxn = \dfrac{Xpn + m - Xpn}{m \cdot \Delta ts} \\[6pt] Vpyn = \dfrac{Ypn + m - Ypn}{m \cdot \Delta ts} \\[6pt] Vpzn = \dfrac{Zpn + m - Zpn}{m \cdot \Delta ts} \end{array} \right\} \quad (10)$$

where (Xpn+m, Ypn+m, Zpn+m) are coorinates of the central point P of the stylus ball at the time $t_o + (n+m) \cdot \Delta ts$.

Figure 12:
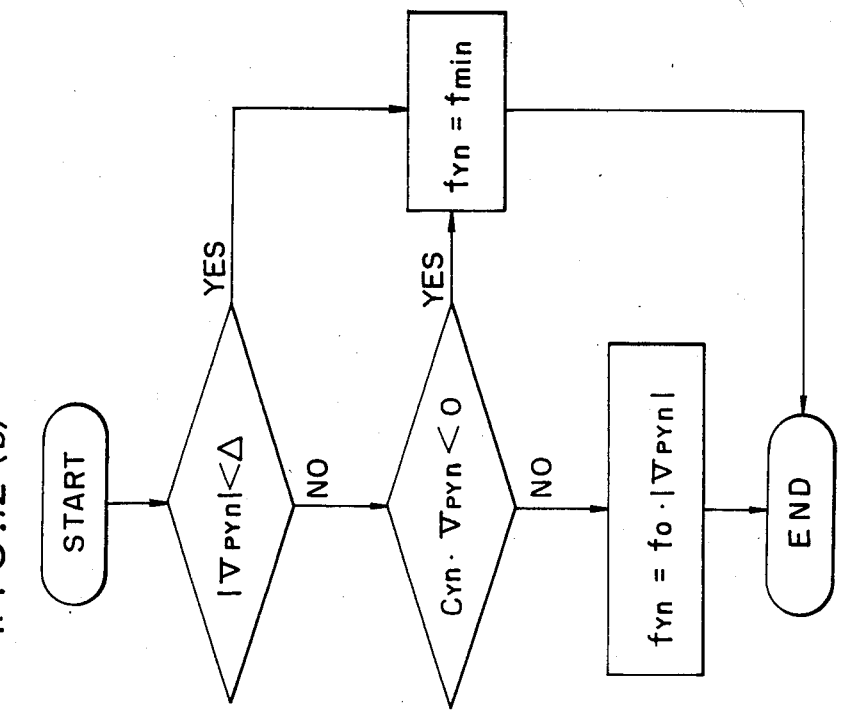
Figure 12:
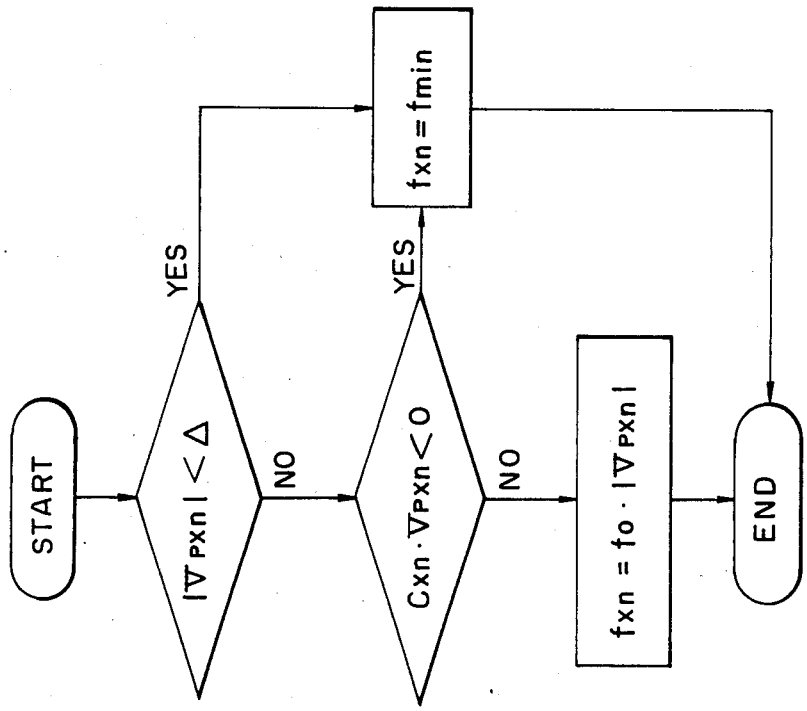
Figure 12:
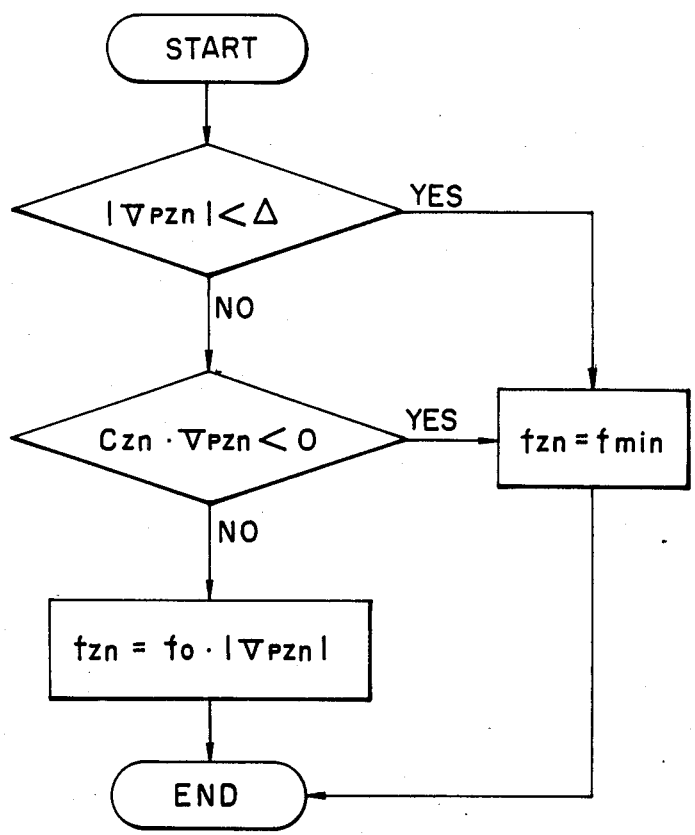

Assuming that the the stylus ball exists at a point P at the time $t_o + n \cdot \Delta ts$, the CPU 240 further calculates pulse distribution numbers Cxn, Cyn and Czn corresponding to movement and pulse frequencies fxn, fyn and fzn corresponding moving velocity upon production of velocity command pulse signals Fx, Fy and Fz for moving the end mill from the point Pn to the point Pn+1 as follows and supplies a data write command on line 242 to a memory 241 in accordance with each value n sequentially to store the calculated values in the memory 241 through a data bus 243.

$$Cxn = (Xpn + l - Xpn)/\Delta h \quad (11)$$

$$Cyn = (Ypn + l - Ypn)/\Delta h$$

$$Czn = (Zpn + l - Zpn)/\Delta h$$

where $\Delta h$ is a minimum unit movement and when Cxn<0, Cyn<0 and Czn<0, movement vectors in the negative direction are represented. fxn, fyn and fzn are determined on the basis of a flow chart shown in FIG. 12, in which:

d; minimum set discrimination quantities of |Vpxn|, |Vpyn| and |Vpzn| fmin; minimum set quantity of fxn, fyn and fzn fo; constant for setting fxn, fyn and fzn.

When the CPU 240 receives a transfer end signal on line 244 from the I/O interface 238, the CPU 240 supplies a data output command on line 245 to the memory 241. Each time the memory 241 receives this command, the memory supplies data concerning the pulse distribution number and the pulse frequency to the I/O interface 238 through a data bus 246. The I/O interface 238 transfers the data concerning the pulse frequency to a buffer register 249 through signal lines 248x, 248y and 248z. The buffer register 249 transfers the data of the pulse distribution number to counters 251x, 251y and 251z through signal lines 250x, 250y and 250z, respectively, and transfers the data of the pulse frequency to pulse distributors 253x, 253y and 253z through signal lines 252x, 252y and 252z, respectively.

Consideration is made to the case where velocity command pulse signals Fx, Fy and Fz, for moving the end mill from point Pn to point Pn+1 on the locus of the point P, are produced. The data Cxn, Cyn and Czn of pulse distribution number are set in the counters 251x, 251y and 251z through the signal lines 250x, 250y and 250z, respectively. The data fxn, fyn and fzn of the pulse frequency are set in the pulse distributors 253x, 253y and 253z through the signal lines 252x, 252y and 252z, respectively. The pulse distributors 253x, 253y and 253z produce velocity instruction pulse signals of the frequencies fxn, fyn and fzn through signal lines 223, 224 and 225. At this time, these velocity instruction pulse signals are fed back to the counters 251x, 251y and 251z through signal lines 254x, 254y and 254z, respectively. When counts of the pulse signals fed back to the counter 251x, 251y and 251z coincide with the pulse distribution numbers Cxn, Cyn and Czn set initially in the counter 251x, 251y and 251z, the counters 251x, 251y and 251z supply distribution end signals to the buffer register 249 and the pulse distributors 253x, 253y and 253z through signal lines 255x, 256x, 255y, 256y, 255z and 256z, respectively. When the pulse distributors 253x, 253y and 253z receive the distribution end signals, the distributors terminate the production of the velocity instruction pulse signals. When the buffer register 249 receives all the pulse distribution end signals in the X, Y and Z directions, the buffer register 249 transfers data Cxn+1, Cyn+1 and Czn+1, and fxn+1, fyn+1 and fzn+1 for moving the end mill from point Pn+1 to point Pn+2 to the counters 251x, 251y and 251z and the pulse distributors 253x, 253y and 253z, respectively. When the data transfer is completed, the transfer end signal on line 255 is supplied to the I/O interface 238 and the transfer end signal on line 244 is further supplied to the CPU 240. When the CPU 240 receives this transfer end signal, the CPU 240 supplies the data output command signal on line 245 to the memory 241 to transfer next data set (Cxn+2, Cyn+2, Czn+2, fxn+2, fyn+2 and fzn+2) to the buffer register 249 through the data bus 246 and the I/O interface 238.

In this manner, the processor 213 in FIG. 9 produces the velocity instruction pulse signal for moving the end mill from a point to an adjacent point on the locus of the central point of the stylus ball sequentially.

Description is now made to the deceleration function for switching the direction while decelerating sufficiently when the profiling direction is suddenly changed with reference to FIGS. 13 and 14.

FIG. 13 shows the profiling operation when movement along the horizontal surface in −X direction changes to movement along the vertical surface in Z direction.

In FIG. 13(a), points Pn, Pn+1 and Pn+m exist on a locus of the profiling operation along the horizontal surface and a command for moving the central point of the end mill from the point Pn to the point Pn+1 is issued, where the points Pn, Pn+1 and Pn+m represent positions of the point P at times $t_o + n \cdot \Delta ts$, $t_o + (n+1) \cdot \Delta ts$ and $t_o + (n+m) \cdot \Delta ts$ (where n and m are integers). In this state, data are as follows.

$$Cxn < 0, \; Cyn = Czn = 0$$

$$\overline{V}pxn = \frac{Xpn + m - Xpn}{m \cdot \Delta ts} = -Vpmax \text{ (max. velocity)}$$

$$\overline{V}pyn = \overline{V}pzn = 0 < d \text{ (min. set discrimination)}$$

-continued $$Cxn \cdot \overline{Vpxn} > 0$$

From the flow chart of FIG. 12, the frequencies are as follows.

$$fxn = foVpmax = fmax \text{ (max. frequency)}$$

$$fyn = fzn = fmin \text{ (min. frequency)}$$

Accordingly, the pulse distribution numbers Cyn and Czn corresponding to movements in Y and Z directions are 0 and the end mill receives a command to be moved from the point Pn to the point Pn+1 at the maximum velocity.

In FIG. 13(b), the points Pn and Pn+1 exist on a locus of the profiling operation along the horizontal surface and the point Pn+m exists on a locus of the profiling operation along the vertical surface. A command for moving the end mill from the point Pn to the point Pn+1 is issued. Since $Cxn\cdot\overline{Vpxn}>0$ and $Cyn=Czn=0$ in this state, only the velocity command pulse in $-X$ direction is produced. However, since $|\overline{Vpxn}|<Vpmax$, $fxn<fmax$ and the end mill is in a state for receiving a command for moving from the point Pn to the point Pn+1. In FIG. 13(c), the velocity $|\overline{Vpxn}|$ is further reduced and the profiling operation along the horizontal surface is performed with further decelerated.

In FIG. 13(d), the points Pn, Pn+1 and Pn+m exist on a locus of the profiling operation along the vertical surface and a command for moving the end mill from the point Pn to the point Pn+1 is issued. In this state, data are as follows.

$$Cxn = Cyn = 0, Czn > 0$$

$$Czn \cdot \overline{Vpzn} > 0$$

Accordingly, only a velocity instruction pulse in Z direction is produced.

The profiling operation along a corner inclined 45° is described with reference to FIG. 14.

In FIG. 14(a), the points Pn, Pn+1 and Pn+m exist on $\overline{BC}$ and a command for moving the end mill from the point Pn to the point Pn+1 is issued. In this state, data are as follows.

$$Cxn = Czn < 0, Cyn = 0$$

$$\overline{Vpxn} = \overline{Vpzn} < 0, \overline{Vpyn} = 0$$

$$|\overline{Vpxn}| = |\overline{Vpzn}| > \Delta \text{ (min. set discrimination)}$$

$$Cxn\cdot\overline{Vpxn} > 0, Czn\cdot\overline{Vpzn} > 0$$

Accordingly, velocity instruction pulse signals having frequencies and distribution numbers in $-X$ and $-Z$ directions being equal to each other are produced.

In FIG. 14(b), the points Pn and Pn+1 exist on $\overline{BC}$ and the point Pn+m exists on $\overline{CD}$. A command for moving the end mill from the point Pn to the point Pn+1 is issued. In this state, data are as follows.

$$Cxn = Czn < 0, Cyn = 0$$

$$\overline{Vpxn} < 0, \overline{Vpzn} < 0, \overline{Vpyn} = 0$$

$$|\overline{Vpxn}| > \Delta, |\overline{Vpzn}| > \Delta$$

$$Cxn, \overline{Vpxn} > 0, Czn\cdot\overline{Vpzn} > 0$$

Accordingly, the velocity instruction pulse signals in $-X$ and $-Z$ directions are produced and the pulse frequencies fxn and fzn are smaller as compared with those in FIG. 14(a).

A first reason thereof is due to the fact that when the tracer is moved along the model, the stylus is subjected to displacement at a direction switching point C and the moving velocity of the tracer is reduced, so that a distance between adjacent points in a train on a locus of the sampled point P is shortened at the point C and just after passage of the point C. Accordingly, an average velocity of the point P between the point Pn and the point Pn+m is decreased.

A second reason is due to the fact that the stylus is moved in $-Z$ direction from the point Pn to the point C and is moved in $+Z$ direction from the point C to the point Pn+m. Accordingly, an absolute value $|\overline{Vpzn}|$ of the average velocity vector $\overline{Vpzn}$ of the central point P of the stylus ball from the point Pn to the point Pn+m is decreased as compared with the state of FIG. 14(a). The frequency fxn in the state of FIG. 14(b) is smaller than that in the state of FIG. 14(a) and the frequency fzn is further smaller.

Since $Cxn = Czn < 0$ in the state of FIG. 14(b), the movement command values in X and Z directions are equal to each other but the pulse distribution in X direction is completed earlier than that in Z direction because of $fxn > fzn$. Since movement command from the point Pn+1 to the point Pn+2 is given after movement from the point Pn to the point Pn+1 is performed and pulse distribution in all X, Y and Z directions is completed, the moving velocity is prescribed by a lower frequency of fxn or fzn when successively moving small sections in a state of $Cxn = Czn \neq 0$.

FIG. 14(c) shows a state of $|\overline{Vpzn}| < 0$ and FIG. 14(d) shows a state of $Czn\cdot\overline{Cpzn} < 0$. In these states, $fzn = fmin$ and hence a command that the end mill passes through the corner with sufficiently decelerated is issued. In FIG. 14(e), the points Pn, Pn+1 and Pn+m exist on $\overline{CD}$ and a command for moving the end mill from the point Pn to the point Pn+1 is issued. In this state, data are as follows.

$$Cxn < 0, Czn > 0, Cyn = 0$$

$$|\overline{Vpxn}| > \Delta, |\overline{Vpzn}| > \Delta$$

$$Cxn\cdot\overline{Vpxn} > 0, Czn\cdot\overline{Vpzn} > 0$$

The velocity command pulses in $-X$ and Z directions are produced.

The advanced memory type profiling control method according to the present invention possesses the following two effects:

(1) A first effect is that the movement of the end mill is controlled on the basis of an exact locus data independently of the profiling error of the tracer to the model based on inertia of the machine and delay of the servo-system and displacement of the stylus due to the contact frictional resistance between the stylus and the model.

This is because the diameter of the stylus ball moving along the model while coming into contact with the model is equal to the diameter of the ball end mill and the locus data of the central point of the stylus ball are used as the locus data for controlling the movement of the end mill.

(2) A second effect is that when the profiling direction is suddenly changed, the sufficient deceleration is previously effected to pass through the direction switch portion. The deceleration function has been described with reference to FIGS. 6 and 7.

More particularly, in the profiling control mechanism according to the present invention, the command is issued to move the end mill on the exact locus along the surface shape of the model and a moderate deceleration is previously effected in accordance with degree of variation of the profiling direction. Accordingly, the profiling operation with high profiling velocity can be performed with high accuracy.

The preceding operation of the tracer to the machine body by a predetermined time in the profiling operation along the model involves the operation that the machine body begins to be driven after the tracer has terminated the profiling operation to the model. In this case, it is necessary to store the command position data and the command velocity data in a large capacity memory.

The advanced memory type profiling control method according to the present invention can drive a plurality of machine bodies and can be widely utilized in machine tools for the profiling control processing such as a die-sinking machine, a gate type machining center, a vertical type machining center and the like.

An embodiment of the advanced memory type profiling control method according to a third aspect of the present invention is described with reference to drawings.

FIG. 17 shows a configuration of a tracer portion of an advanced detection type tracer used to implement the method according to the third embodiment of the present invention.

A spindle 303 is linked to an eccentric shaft 301 at a point Q and the eccentric shaft 301 is rotated by a motor 309. A phase $\alpha$ of a rotational angle of the eccentric shaft 301 is detected by an angle detector 310. The spindle 303 is rotatably and slidably supported at a fulcrum 304. A stylus, that is, a contact element 305 disposed at a lower end of the spindle 303 is controlled so that a reaction torque to a load of the motor 309 is constant when the stylus 305 is moved along a model 307 for the profiling operation while being brought into contact with model 307. Accordingly, the stylus 305 is moved along the model 307 while being pressed on the model 307 by a predetermined force and always preceding an end mill (being imaged) shown by broken line by a distance $\epsilon$.

FIG. 18 is a block diagram of a controller for the advanced detection type tracer used in the present invention.

Since the tracer of the present invention shown in FIG. 17 corresponds to a spindle head of the machine body, it is considered that coordinates (X, Y, Z) of the central point T of the eccentric shaft 301 is a representative point of the machine body.

Signals concerning the coordinates (X, Y, Z) are obtained from a position detector of the machine body and a signal concerning the phase of the rotational angle of the eccentric shaft 301 is obtained from the angle detector 310. These signals are supplied to a sampler 315 through signal lines 311, 312, 313 and 314. The sampler 315 samples these signals at a predetermined time and supplies them to an I/O interface 317 through signal lines 316x, 316y, 316z and 316α. Data concerning the signals X, Y, Z and $\alpha$ inputted to the I/O interface 317 are supplied to a processor 318 through a data bus 331 in response to a data fetch signal on signal line 342 from the processor 318.

The machine body is driven by velocity command pulse signals Vcx, Vcy and Vcz produced from pulse distributors 319x, 319y and 319z shown in FIG. 18. Description is made to the driving of the machine body.

FIG. 21 is a block diagram of an NC servo driver for driving the machine body.

The velocity instruction pulses are inputted to a subtractive counter 321 through a signal line 320. The subtractive counter 321 is supplied with feedback pulses produced from a pulse coder 322 forming a position detector provided in the machine body through a signal line 323 and counts the number of the velocity instruction pulses and the number of the feedback pulses. A difference between both the counts is supplied as a movement command from the counter 321 to a control driver 325 through a signal line 324. Accordingly, a movement per one velocity instruction pulse corresponds to a minimum unit movement and a pulse frequency of the velocity instruction pulse signal corresponds to a movement velocity.

The processor 318 in the controller performs the following calculations on the basis of the data concerning the signals X, Y, Z and $\alpha$ at each sampling time.

(1) Calculation of the coordinates (Xpn, Ypn, Zpn) of the central point P of the stylus ball:

The data concerning the signals X, Y, Z and $\alpha$, at a time $t_0 + n \cdot \Delta ts$ (where n is an integer and $\Delta ts$ is a sampling time) are Xn, Yn, Zn and $\alpha n$ and calculation is made on the basis of the data.

When the profiling operation is made, for example, in the X-Y plane, Ypn is constant and Xpn and Zpn are calculated as follows (refer to FIG. 20).

$$Ypn = \text{constant} \tag{12}$$

$$Xpn = Xn - \frac{r\cos\alpha n(L - \sqrt{r^2 + l^2 + 2lr\sin\alpha n}\ )}{\sqrt{r^2 + l^2 + 2lr\sin\alpha n}} \tag{13}$$

$$Zpn = Zn - l - \frac{(l + r\sin\alpha n)(L - \sqrt{r^2 + l^2 + 2lr\sin\alpha n}\ )}{\sqrt{r^2 + l^2 + 2lr\sin\alpha n}} \tag{14}$$

where l: a distance between the fulcrum 304 of the tracer and the point T shown in FIG. 17
L: a length of $\overline{PQ}$ shown in FIG. 17
r: a length of $\overline{TQ}$
P: a foot of a perpendicular line extending from the point Q to a vertical line passing through the fulcrum 304 (S)
F: a foot of a perpendicular line extending from the point P to the vertical line passing through the fulcrum 304 (S)

$$\overline{QR} = r \cdot \cos\alpha n,\ \overline{RS} = l + r \cdot \sin\alpha n$$

$$\overline{QS} = \sqrt{r^2 + l^2 + 2lr \cdot \sin\alpha n}$$

$$\overline{SP} = L - \sqrt{r^2 + l^2 + 2lr \cdot \sin\alpha n}$$

$$\overline{PF} = \overline{QR} \times \overline{SP}/\overline{QS} = r \cdot \cos\alpha n \times \frac{L - \sqrt{r^2 + l^2 + 2lr\sin\alpha n}}{\sqrt{r^2 + l^2 + 2lr\sin\alpha n}}$$

-continued $$\overline{SF} = \overline{RS} \times \overline{SP}/\overline{QS} = (l + r \cdot \sin\alpha n) \cdot \frac{L - \sqrt{r^2 + l^2 + 2lr\sin\alpha n}}{\sqrt{r^2 + l^2 + 2lr\sin\alpha n}}$$

$$\overline{TF} = l + \overline{SF}$$

(2) Calculation of the command velocity value and movement distance command value:

The processor 318 calculates the velocity command pulse frequencies (fxn, fyn, fzn) and the pulse numbers (Cxn, Cyn, Czn) for each axis when the central point of the ball of the end mill (tool) is moved from the point (Xpn, Ypn, Zpn) to a point (Xpn+1, Ypn+1, Zpn+1) as follows.

$$Cxn = (Xpn + 1 - Xpn)/\Delta h \quad (14)$$

$$Cyn = (Ypn + 1 - Ypn)/\Delta h$$

$$Czn = (Zpn + 1 - Ypn)/\Delta h$$

where $\Delta h$ is a minimum unit movement.

When the pulse numbers Cxn (Cyn or Czn) is negative, the movement command in the negative direction is signified. The frequencies fxn and fyn of the velocity command pulse are calculated as follows depending on a region of m divided regions (m is an integer) in which $\alpha n$ exists as shown in FIG. 19 when the profiling operation is made, for example, in X-Z plane.

The processor 318 determines a region in which $\alpha n$ exists. When $\alpha n$ exists in, for example, the k-th region (where k is an integer of $1 \leq k \leq m$), the data set ($|\cos 2\pi(k-1)/m|$, $|\sin 2\pi(k-1)/m|$) is read out from a data table stored in the memory 326 in response to a read out command signal 327 and transferred to an internal register of the processor 318 through data bus 328.

When the maximum frequency of the velocity command pulse is fmax, the frequencies fxn and fzn are calculated as follows.

$$fxn = f\max \cdot \left| \cos \frac{2\pi(k-1)}{m} \right| \quad (16)$$

$$fzn = f\max \cdot \left| \sin \frac{2\pi(k-1)}{m} \right| \quad (17)$$

The processor 318 transfers the frequencies (fxn, fyn, fzn) and the pulse numbers (Cxn, Cyn, Czn) of the velocity instruction pulses, upon movement from the point (Xpn, Ypn, Zpn) to the point (Xpn+1, Ypn+1, Zpn+1), through data bus 329 to the memory 326 to store them to the memory 326 by a write command signal on signal line 330. The data (fxn, fyn, fzn) and (Cxn, Cyn, Czn) stored in the memory 326 are successively supplied to the I/O interface 317 through data bus 333 in response to a data output command signal on line 332. The data of the pulse numbers (Cxn, Cyn, Czn) are transferred to counters 334x, 334y and 334z through signal lines 335x, 335y and 335z, respectively, so that the pulse numbers corresponding to movement distance for moving from the point (Xpn, Ypn, Zpn) to the point (Xpn+1, Ypn+1, Zpn+1) are set to the counters, respectively. Further, the data fxn, fyn and fzn are transferred to pulse distributors 319x, 319y and 319z through signal lines 336x, 336y and 336z, respectively, so that the pulse frequencies corresponding to moving velocity upon movement from the point (Xpn, Ypn, Zpn) to the point (Xpn+1, Ypn+1, Zpn+1) are set to the pulse distributors, respectively. The pulse distributors 319x, 319y and 319z supply pulse signals of the frequencies fxn, fyn and fzn through signal lines 337x, 337y and 337z, respectively, to an NC servo driver for the machine body as shown in FIG. 21. At the same time, these pulse signals are fed back to the counters 334x, 334y and 334z through signal lines 338x, 338y and 338z, respectively. When the numbers of the pulse signals fed back to the counters 334x, 334y and 334z coincide with the pulse numbers Cxn, Cyn and Czn initially set therein, the counters are reset and distribution end signals are supplied to the pulse distributors through signal lines 339x, 339y and 339z, respectively. The pulse distributors 319x, 319y and 319z stop to distribute the pulse signals in response to the distribution end signals. The distribution end signals are supplied to the I/O interface 317 through signal lines 340x, 340y and 340z. When the distribution of all pulses in X, Y and Z directions is completed, the I/O interface 317 supplies an output end signal to the processor 318 through a signal line 341.

When the processor 318 receives the output end signal, the processor 318 causes the memory 326 to produce the data concerning the pulse numbers (Cxn+1, Cyn+1, Czn+1) and the pulse frequencies (fxn+1, fyn+1, fzn+1) for moving from point (Xpn+1, Ypn+1, Zpn30 1) to point (Xpn+2, Ypn+2, Zpn+2) to the I/O interface 317 through the data bus 333. The data concerning the pulse numbers and the pulse frequencies are supplied to the counters 334x, 334y and 334z and the pulse distributors 319x, 319y and 319z. In this manner, the velocity instruction pulse signals of an instruction signal concerning the movement distance and the movement velocity for moving between adjacent points on the locus of the central point of the stylus ball are successively produced to the NC servo driver of the machine body.

Operation of the advanced detection type tracer used in the present invention shown in FIG. 17 is now described.

Referring to FIG. 22, the profiling operation when movement along the horizontal surface (X direction) changes to movement along the vertical surface (Z direction) is considered. The sampling time $\Delta t_s$ of the sampler is set so that the distance between adjacent points on the locus of the point P calculated by the processor 318 is sufficiently smaller as compared with the distance between the central point O of the end mill (being imaged) and a center P of the ball of the stylus in FIG. 22. FIG. 22(a) shows the profiling operation along the horizontal surface in $-X$ direction. At this time, a movement command for moving the central point O of the end mill from a point Ak to a point Ak+1 on the locus of the point P as shown in FIG. 23(a) is produced. Since $|\cos \alpha| = 1$ and $|\sin \alpha| = 0$ in this state, the set frequency of the velocity instructuon pulse in $-X$ direction is maximum and the set frequency of the velocity instruction pulse in Z direction is 0. The pulse number of the velocity instruction pulse in $-X$ direction upon movement the point Ak to the point Ak+1 is proportional to distance between the point Ak and the point Ak+1 while the pulse number in Z direction is 0.

In FIG. 22(b), the central point P of the stylus ball begins to perform the profiling operation along the vertical surface while the central point O of the end mill performs the profiling operation along the horizontal surface. At this time, a movement command for moving the central point O of the end mill from a point Aj to a point Aj+1 on the locus of the point P as shown in FIG. 23(b) is produced. Since $|\cos \alpha| < 1$ and $|\sin \alpha| > 0$ in this state, the set frequency of the velocity instruction pulse in $-X$ direction is decreased while the set frequency of the velocity instruction pulse in Z direction is increased. Since the distance between the point Aj and the point Aj+1 in Z direction is 0, the pulse number set in the counter 334z through the signal line 335z is 0. Accordingly, the velocity instruction pulse signal in Z direction is not produced and only the velocity instruction pulse signal in $-X$ direction is produced. A command is produced to move the point O in $-X$ direction at a decelerated velocity.

In FIG. 22(c), the point P is further moved in the vertical direction and the point O is continuously moved along the horizontal surface. At this time, a movement command for moving the point O from a point An to a point An+1 on the locus of the point P as shown in FIG. 22(c) is produced. In this state, $|\cos \alpha|$ is still smaller and the movement velocity in $-X$ direction is decelerated while the velocity instruction pulse signal in Z direction is not produced. In this manner, when the profiling operation along the horizontal surface changes to the profiling operation along the vertical surface, after the end mill sufficiently approaches the direction switch point of the corner while performing the profiling operation along the horizontal surface with sufficient deceleration, the profiling direction is switched to the vertical direction as shown in FIG. 22(d).

EFFECTS OF THE INVENTION

In the advanced detection type tracer according to the present invention, when the profiling direction is suddenly changed, for example, at a corner, a function similar to the exact stop check function of the NC machine tool is exhibited to switch the profiling direction after sufficiently approaching the direction switch point while sufficiently decelerated. Accordingly, even when the profiling direction is suddenly changed, the profiling operation with high accuracy can be performed. It is essentially different from the conventional advanced detection type tracer in which a command velocity vector is constant in magnitude and only the direction thereof is controlled.

Generally, in a conventional tracer, when the profiling velocity is increased, since the processing accuracy is deteriorated upon sudden variation of the profiling direction at a corner, the profiling velocity can not be increased. However, in the advanced detection type tracer based according to the present embodiment, since deceleration is sufficiently effected, a maximum profiling velocity can be established and hence the profiling operation can be performed at a high speed with high efficiency.

Although the conventional advanced detection type tracer possesses the deceleration function upon variation of the profiling direction, the tracer has the following deficiencies. Since acceleration is made in one drive direction at the same time when deceleration is made in the other drive direction, an uncut portion is produced at a corner and sharp processing is difficult. While the preceding quantity of the stylus to the end mill is set to be equal to deceleration deviation and is fixed mechanically, since velocity deviation is different depending on the profiling velocity and the drive direction, processing accuracy is not sufficient if the preceding quantity is fixed.

In the advanced detection type tracer according to the present invention, the coordinates of points on the locus of the central point of the stylus are calculated and movement command for moving between adjacent points is produced. The movement velocity at this time is controlled on the basis of the phase of the rotational angle of the eccentric shaft. Accordingly, the preceding quantity of the stylus to the end mill is set to be sufficiently larger than the velocity deviation so that deceleration can be previously effected sufficiently even if the profiling direction is suddenly changed and the movement is commanded, and hence an uncut portion is not produced and processing with high accuracy can be performed even when a corner portion is processed.

Implementation of the present invention can be effected by great progress of recent electronics technique including microcomputers and the processing operation with high accuracy and high responsive characteristic can be attained. Further greater progress of the electronics technique is expected and hence the present invention is expected to exhibit its effect increasingly in future.

The advanced detection type tracer according to the present invention can be widely utilized in the machine tool for the profiling control processing such as a die-sinking machine, a vertical type machining center and a gate type machining center.

We claim:
1. A profiling control method of an advanced memory type for a machine tool including:
   a tracer provided with a stylus at an end thereof which is moved along a surface of a model for detecting a shape of the model, said stylus performing a spheric motion around a ball seat fixed in the tracer, and the tracer comprises means for detecting components $e_x$, $e_y$ and $e_z$ in a three-orthogonal-axis system of positional variation of the stylus to the ball seat of the tracer;
   a control unit for producing control signals for the tracer by utilizing an output signal of the tracer;
   a tracer drive unit for moving the tracer on the basis of the control signals for the tracer;
   a machine body for controlling a cutting tool on the basis of the control signals for the tracer;
   said method comprising the steps of:
   calculating coordinates of the stylus from the coordinates (X, Y, Z) of the ball seat and the positional variations ($e_x$, $e_y$, $e_z$) on the basis of the following equations:

$$Xp = X + e_x$$

$$Yp = Y + e_y$$

$$Zp = Z + e_y - l$$

where l is a distance between the ball seat and the stylus when $e_z = 0$, said coordinates being used as the control signals for the tracer;
   calculating control signals for the machine body by calculating respective numbers (Cxn, Cyn, Czn) of distribution pulses, corresponding to movement of an end mill of the machine body, from coordinates (Xpn+1, Ypn+1, Zpn+1) and (Xpn, Ypn, Zpn) at sampling times n+1 and n on the basis of the following equations:

$$Cxn = (Xpn+1 - Xpn)/\Delta h$$

$$Cyn = (Ypn+1 - Ypn)/\Delta h$$

$$Czn = (Zpn+1 - Zpn)/\Delta h$$

wherein $\Delta h$ is a unit of minimum movement of the end mill, and when $Cxn<0$, $Cyn<0$ $Czn<0$, movements of the end mill in a negative direction are represented, respectively;

storing the control signals for the machine body in a memory; and driving the end mill on the basis of the control signals for the machine body stored in the memory, characterized in that said step of calculating the control signals comprises a step of calculating average velocity vectors (Vpxn, Vpyn, Vpzn) of the stylus from coordinates (Xpn+m, Ypn+m, Zpn+m) and (Xp, Yp, Zp) of the stylus at sampling times n+m and n on the basis of the following equations:

$$V_{pxn} = \frac{X_{pn+m} - X_{pn}}{m \cdot \Delta ts}$$

$$V_{pyn} = \frac{Y_{pn+m} - Y_{pn}}{m \cdot \Delta ts}$$

$$V_{pzn} = \frac{Z_{pn+m} - Z_{pn}}{m \cdot \Delta ts}$$

where $\Delta ts$ is a time interval for sampling.

2. A method according to claim 1, characterized in that said step of calculating the control signal comprises a step of determining pulse frequencies (fxn, fyn, fzn) corresponding to movement velocity of the end mill of the machine body on the basis of the pulse distribution number (Cxn, Cyn, Czn) and the average velocity vector (Vpxn, Vpyn, Vpzn) under the following conditions:

(1) when an absolute value of Vpjn is smaller than a predetermined value $\Delta(|Vpjn|<\Delta)$, fjn=fmin, where j=x, y and z, and fmin is a minimum set value of fjn;

(2) when an absolute value of Vpjn is larger than the value $\Delta(|Vpjn|>\Delta)$ and Cjn·Vpjn<0, fjn=fmin; and (3) when an absolute value of Vpjn is larger than the value $\Delta(|Vpjn|>\Delta)$ and Cjn·Vpjn>0, fjn=fo·|Vpjn|, where fo is a predetermined constant.

3. A method according to claim 2, characterized in that said control unit comprises counters in which the pulse distribution numbers (Cxn, Cyn, Czn) are preset, and pulse distributors are producing signals having the pulse frequencies fxn, fyn and fzn, and movement of the cutting tool corresponds to the pulse distribution number by moving the cutting tool at a speed corresponding to the pulse frequency, and stopping an output of the pulse distributor when the output pulses of the pulse distributor coincides with the pulse distribution number.

4. A method according to claim 1, characterized in that said tracer comprises a stylus which is moved along a surface of the model, a spindle having an end on which the stylus is fixed and which is rotatably and slidably supported on a fulcrum of the tracer, an eccentric shaft which is rotatably coupled with the other end of the spindle, a motor for applying the eccentric shaft with torque balancing with reaction excerted on the stylus from the model by changing a phase rotational angle $\alpha$, and an angle detector for detecting the rotational angle $\alpha$ of the motor.

* * * * *

UNITED STATES PATENT AND TRADEMARK OFFICE
CERTIFICATE OF CORRECTION

PATENT NO. : 4,702,652

DATED : October 27, 1987

INVENTOR(S) : Tadashi Rokkku et al

It is certified that error appears in the above-identified patent and that said Letters Patent is hereby corrected as shown below:

In the heading of the Patent, it should read:

-- [75] Inventors: Tadashi Rokkaku; Akira Houzouji; Shunji Ohmori; Takayuki Goto, all of Hiroshima, Japan Signed and Sealed this Seventeenth Day of January, 1989

Attest:

DONALD J. QUIGG

*Attesting Officer*   *Commissioner of Patents and Trademarks*